United States Patent
Ye et al.

(10) Patent No.: US 11,374,490 B2
(45) Date of Patent: Jun. 28, 2022

(54) POWER CONVERSION SYSTEM

(71) Applicant: Delta Electronics, Inc., Taoyuan (TW)

(72) Inventors: Zhengyu Ye, Taoyuan (TW); Xueliang Chang, Taoyuan (TW); Qinghua Su, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/167,941

(22) Filed: Feb. 4, 2021

(65) Prior Publication Data
US 2021/0265909 A1    Aug. 26, 2021

(30) Foreign Application Priority Data

Feb. 21, 2020  (CN) .......................... 202010108411.8

(51) Int. Cl.
| | |
|---|---|
| *H02M 3/07* | (2006.01) |
| *G05F 3/16* | (2006.01) |
| *H02M 3/335* | (2006.01) |
| *H02M 1/00* | (2006.01) |

(52) U.S. Cl.
CPC ............... *H02M 3/07* (2013.01); *G05F 3/16* (2013.01); *H02M 3/33523* (2013.01); *H02M 1/0058* (2021.05)

(58) Field of Classification Search
CPC .. H02M 3/07; H02M 3/33523; H02M 1/0058; G05F 3/16
See application file for complete search history.

(56) References Cited

U.S. PATENT DOCUMENTS

| | | | |
|---|---|---|---|
| 6,417,649 B1 | 7/2002 | Brink | |
| 2015/0222193 A1* | 8/2015 | Zambetti | ............. H02M 3/3376 |
| | | | 363/21.02 |
| 2017/0099002 A1* | 4/2017 | Trevisan | ........... H02M 3/33523 |

(Continued)

FOREIGN PATENT DOCUMENTS

| | | |
|---|---|---|
| CN | 102916603 A | 2/2013 |
| CN | 101420179 B | 3/2013 |
| CN | 103973094 B | 8/2016 |

(Continued)

*Primary Examiner* — Kyle J Moody
*Assistant Examiner* — Lakaisha Jackson
(74) *Attorney, Agent, or Firm* — Kirton McConkie; Evan R. Witt

(57) ABSTRACT

A power conversion system includes a power conversion circuit and a start circuit. The power conversion circuit includes a first terminal, a second terminal, an output capacitor, at switching unit, a flying capacitor and a magnetic element. The second switching unit includes two switch groups. The flying capacitor is connected between the first terminal and the second terminal. The magnetic element includes two first windings that are electromagnetically coupled with each other. A first one of the two first windings is electrically connected between one switch group and the second terminal of the power conversion circuit. A second one of the two first windings is electrically connected between the other switch group and the second terminal of the power conversion circuit. The start circuit includes a third winding, an inductor and at least one switch element. The third winding is electromagnetically coupled with the first windings.

20 Claims, 33 Drawing Sheets

(56) References Cited

U.S. PATENT DOCUMENTS

2017/0353116 A1* 12/2017 Zhang .................. H02M 3/073
2021/0211059 A1* 7/2021 Jin .................... H02M 3/33569

FOREIGN PATENT DOCUMENTS

| CN | 104467016 B | 7/2017 |
| CN | 108768194 A | 11/2018 |
| CN | 106301046 B | 12/2018 |
| CN | 104242625 B | 1/2019 |
| CN | 107070276 B | 4/2019 |
| CN | 108512407 B | 8/2019 |
| CN | 110677060 A | 1/2020 |
| CN | 108847769 B | 3/2020 |
| CN | 111277131 A | 6/2020 |

* cited by examiner

POWER CONVERSION SYSTEM

CROSS-REFERENCE TO RELATED APPLICATION

This application claims priority to China Patent Application No. 202010108411.8, filed on Feb. 21, 2020. The entire contents of the above-mentioned patent application are incorporated herein by reference for all purposes.

FIELD OF THE INVENTION

The present invention relates to a power conversion system, and more particularly to a power conversion system capable of pre-charging a flying capacitor and an output capacitor to achieve a soft-start function.

BACKGROUND OF THE INVENTION

Nowadays, the power conversion circuit is widely used. For achieving the high current through the non-isolated structure, the power conversion circuit has a resonant and duty-cycle-expandable circuit topology. The power conversion circuits with the resonant and duty-cycle-expandable circuit topology are usually divided into a symmetrical type and an asymmetrical type. Regardless of the type of the power conversion circuit, the ratio of the input voltage to the output voltage is fixed. Alternatively, the ratio of the input voltage to the output voltage can be determined and adjusted according to the practical requirements.

The power conversion circuit with the resonant and duty-cycle-expandable circuit topology usually includes a flying capacitor and an output capacitor. When the power conversion circuit is started, a large current is generated because the terminal voltages of the flying capacitor and the output capacitor are low. The large current results in a large current impact on the electronic components of the power conversion circuit. Consequently, the electronic components of the power conversion circuit are readily damaged. For protecting the electronic components, it is necessary to use the electronic components with high current-resistant properties. However, the electronic components with high current-resistant properties are not cost-effective.

SUMMARY OF THE INVENTION

An object of the present invention provides a power conversion system. The power conversion system includes a power conversion circuit and a start circuit. The start circuit is used to pre-charge a flying capacitor and an output capacitor of the power conversion circuit. When the terminal voltages of the flying capacitor and the output capacitor are charged to the preset voltage, the start process of the power conversion circuit is completed. Consequently, the electronic components in the power conversion system (e.g., switches) will not be suffered from the impact of the large current, and the possibility of causing the damage of the electronic components is largely reduced. Moreover, the cost-effective electronic components can be employed.

In accordance with an aspect of the present invention, a power conversion system is provided. The power conversion system includes a power conversion circuit and a start circuit. The power conversion circuit includes a first terminal, a second terminal, an output capacitor, at least one switching unit, at least one flying capacitor and a magnetic element. Each switching unit includes two switch groups. The at least one flying capacitor is connected between the first terminal and the second terminal of the power conversion circuit. The magnetic element includes two first windings. The two first windings are electromagnetically coupled with each other. A first one of the two first windings is electrically connected between a first one of the two switch groups and the second terminal of the power conversion circuit. A second one of the two first windings is electrically connected between a second one of the two switch groups and the second terminal of the power conversion circuit. In addition, the opposite-polarity terminals of the two first windings are electrically connected with the second terminal of the power conversion circuit. The start circuit is configured to control the power conversion circuit to pre-charge and includes a third winding, an inductor and at least one switch element. The third winding is electromagnetically coupled with the two first windings. The inductor and the third winding are connected in series to form a serially-connected structure. A first terminal of the serially-connected structure is electrically connected with the first terminal of the power conversion circuit. A second terminal of the serially-connected structure is electrically connected with the second terminal of the power conversion circuit. A first terminal of the at least one switch element is electrically connected with the first terminal of the serially-connected structure. During a start process of the power conversion circuit, an on/off state of the at least one switch element is switched. Consequently, the at least one flying capacitor and the output capacitor are pre-charged.

In accordance with another aspect of the present invention, a power conversion system is provided. The power conversion system includes at least two power conversion circuits and a start circuit. Each power conversion circuit includes a first terminal, a second terminal, an output capacitor, at least one switching unit, at least one flying capacitor and a magnetic element. Each switching unit includes two switch groups. The at least one flying capacitor is connected between the first terminal and the second terminal of the power conversion circuit. The magnetic element includes two first windings. The two first windings are electromagnetically coupled with each other. A first one of the two first windings is electrically connected between a first one of the two switch groups and the second terminal of the power conversion circuit. A second one of the two first windings is electrically connected between a second one of the two switch groups and the second terminal of the power conversion circuit. In addition, the opposite-polarity terminals of the two first windings are electrically connected with the second terminal of the power conversion circuit. The first terminals of the two power conversion circuits are electrically connected with each other. The second terminals of the two power conversion circuits are electrically connected with each other. The start circuit is configured to control the at least two power conversion circuits to pre-charge and includes at least two third windings, an inductor and at least one switch element. The at least two third windings are connected with other in parallel. Each third winding is electromagnetically coupled with the two first windings of the corresponding power conversion circuit. The inductor and the parallel-connected third windings are connected in series to form a serially-connected structure. A first terminal of the serially-connected structure is electrically connected with the first terminal of the power conversion circuit. A second terminal of the serially-connected structure is electrically connected with the second terminal of the power conversion circuit. A first terminal of the at least one switch element is electrically connected with the first terminal of the serially-connected structure.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
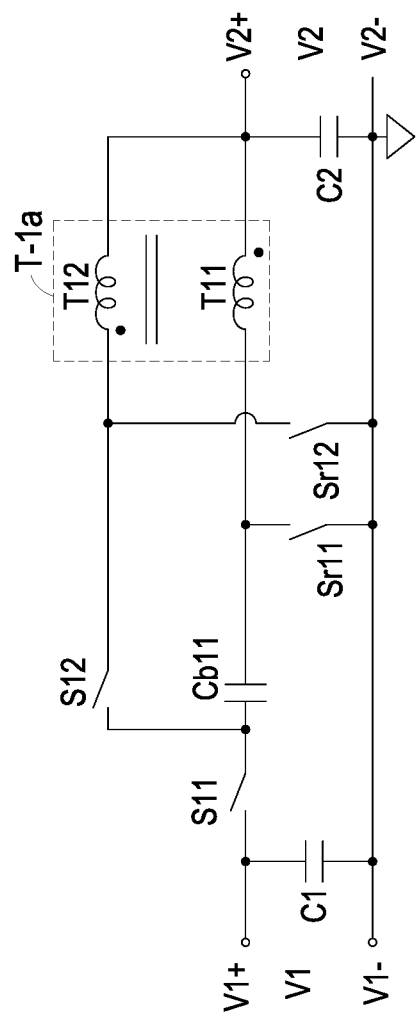
FIG. 1A is a schematic circuit diagram illustrating a power conversion circuit with a 4:1 asymmetric, resonant and duty-cycle-expandable circuit topology.
Figure 1B:
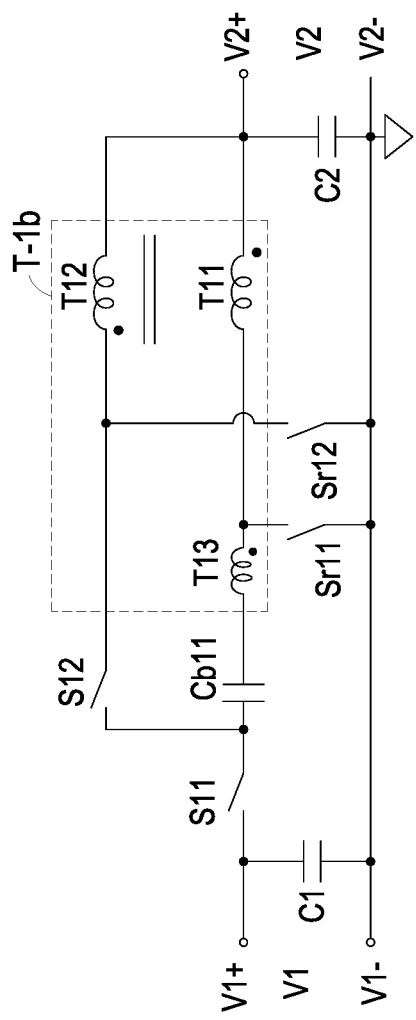
FIG. 1B is a schematic circuit diagram illustrating a power conversion circuit with an N:1 asymmetric, resonant and duty-cycle-expandable circuit topology.
Figure 2A:
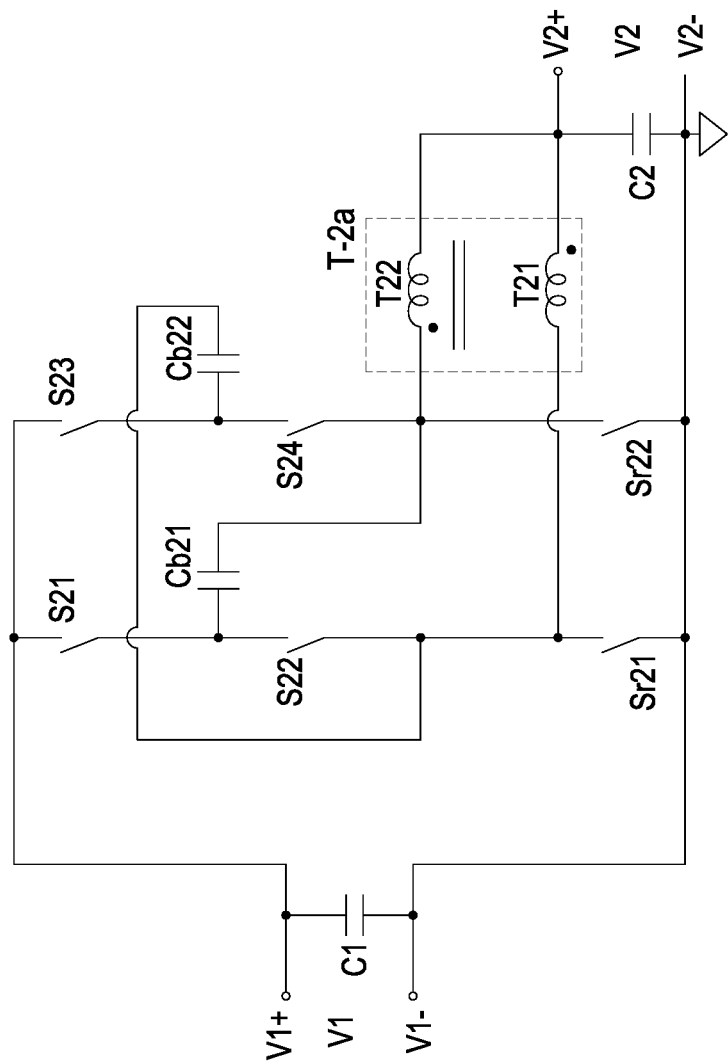
FIG. 2A is a schematic circuit diagram illustrating a power conversion circuit with a 4:1 symmetric, resonant and duty-cycle-expandable circuit topology.
Figure 2B:
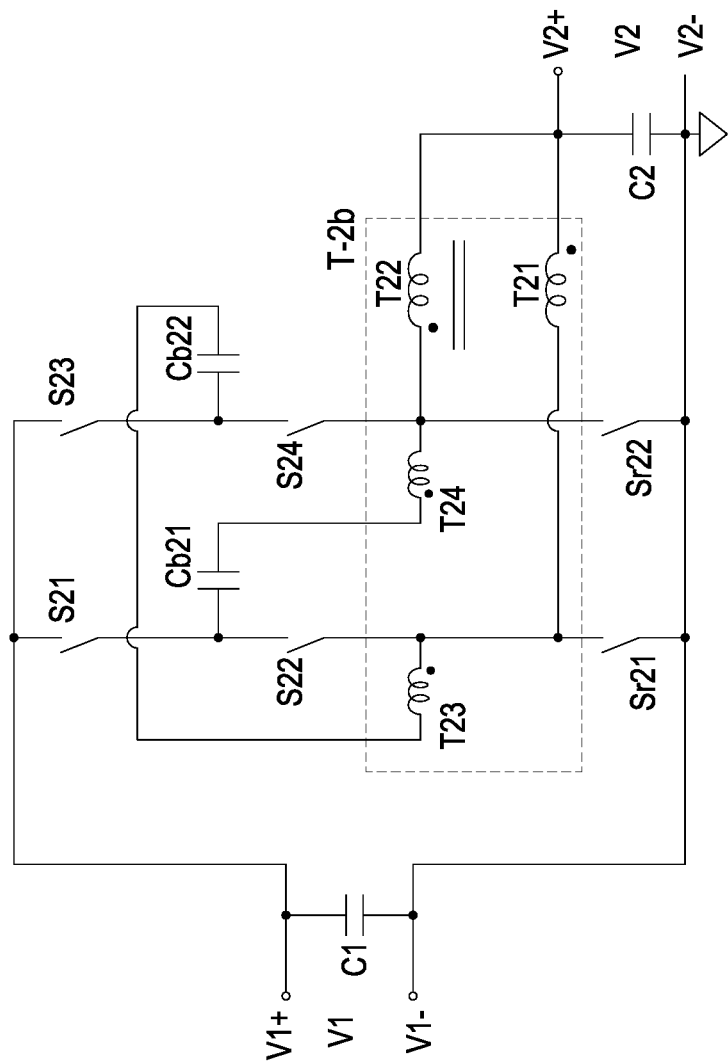
FIG. 2B is a schematic circuit diagram illustrating a power conversion circuit with an N:1 symmetric, resonant and duty-cycle-expandable circuit topology.
Figure 2C:
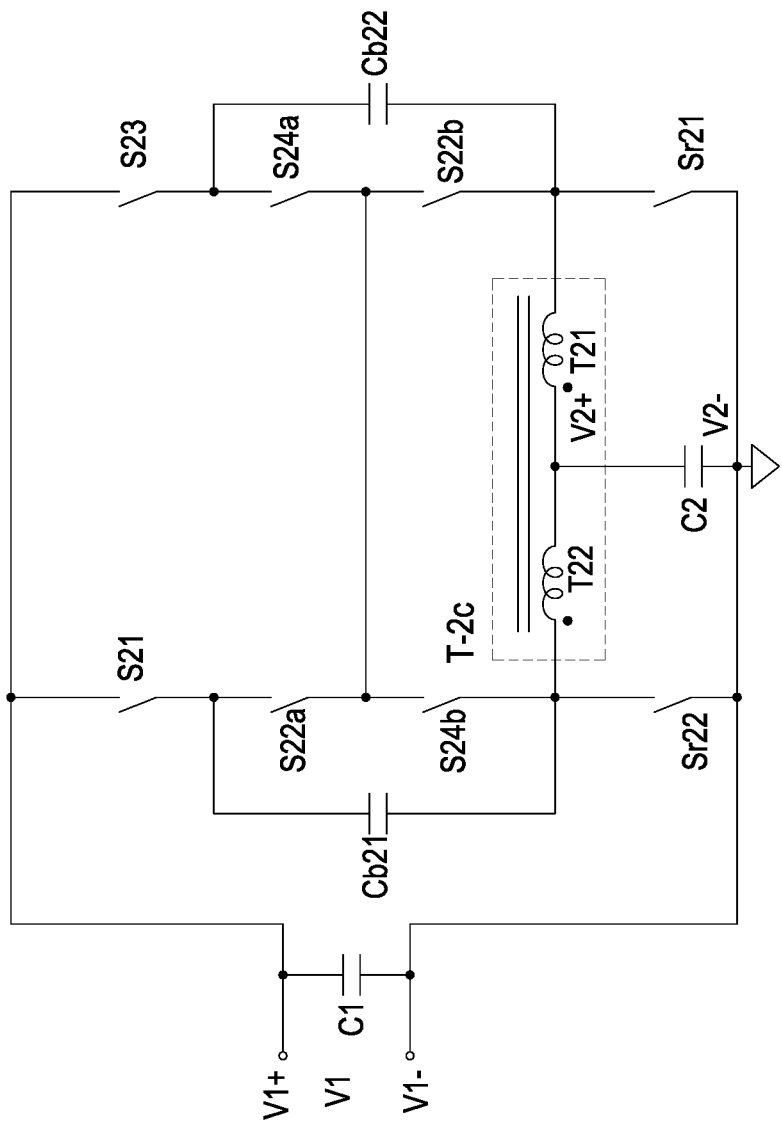
FIG. 2C is a schematic circuit diagram illustrating a variant example of power conversion circuit with a 4:1 symmetric, resonant and duty-cycle-expandable circuit topology.
Figure 2D:
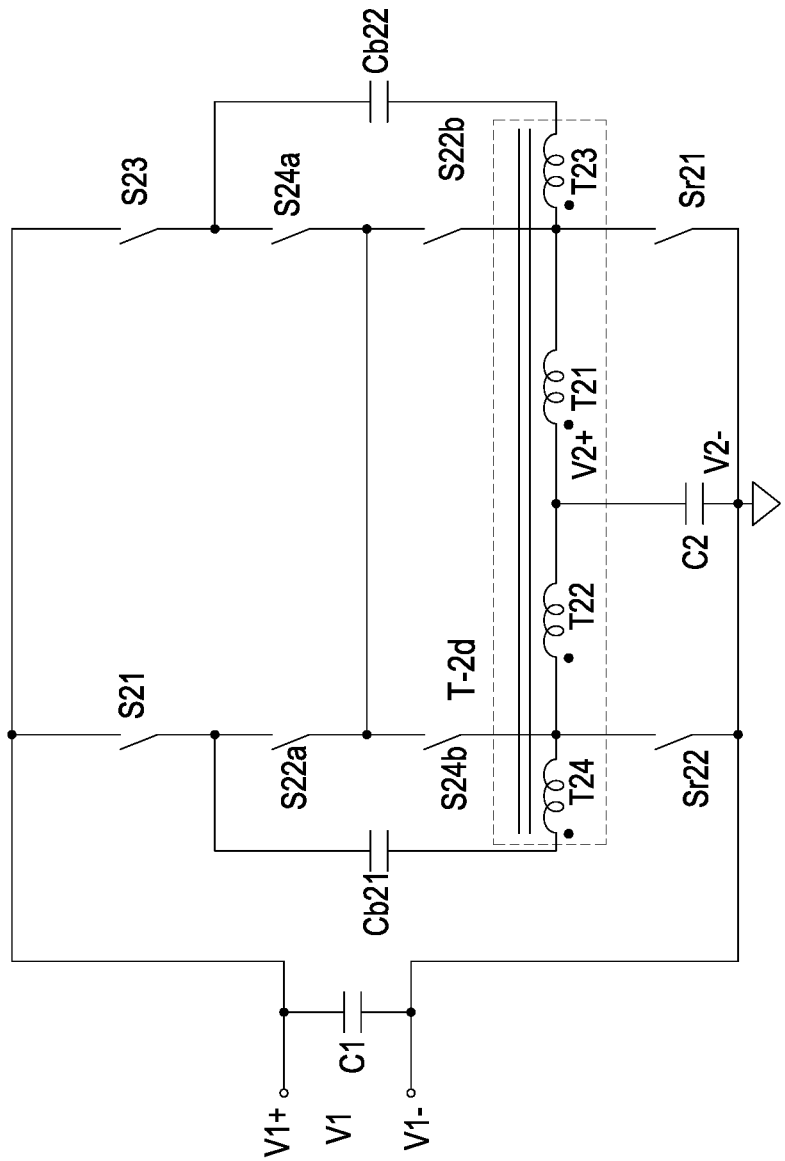
FIG. 2D is a schematic circuit diagram illustrating a variant example of a power conversion circuit with an N:1 symmetric, resonant and duty-cycle-expandable circuit topology.

FIG. 1A is a schematic circuit diagram illustrating a power conversion circuit with a 4:1 asymmetric, resonant and duty-cycle-expandable circuit topology. FIG. 1B is a schematic circuit diagram illustrating a power conversion circuit with an N:1 asymmetric, resonant and duty-cycle-expandable circuit topology. FIG. 2A is a schematic circuit diagram illustrating a power conversion circuit with a 4:1 symmetric, resonant and duty-cycle-expandable circuit topology. FIG. 2B is a schematic circuit diagram illustrating a power conversion circuit with an N:1 symmetric, resonant and duty-cycle-expandable circuit topology. FIG. 2C is a schematic circuit diagram illustrating a variant example of power conversion circuit with a 4:1 symmetric, resonant and duty-cycle-expandable circuit topology. FIG. 2D is a schematic circuit diagram illustrating a variant example of a power conversion circuit with an N:1 symmetric, resonant and duty-cycle-expandable circuit topology.

Each of the power conversion circuits has the function of converting the electric power in the bidirectional manner. Moreover, the power conversion circuit has a resonant and duty-cycle-expandable circuit topology. Each power conversion circuit includes a first terminal (including a first positive electrode V1+ and a first negative electrode V1−), a second terminal (including a second positive electrode V2+ and a second negative electrode V2−), at least one first switching unit, a second switching unit, a first capacitor, a second capacitor, at least one flying capacitor and a magnetic element. The first negative electrode V1− and the second negative electrode V2− are connected to a ground terminal. Each power conversion circuit includes a plurality of switches. Each switch has a switching cycle Ts.

As shown in FIG. 1A, the power conversion circuit 1a has an asymmetric circuit topology, in which the ratio of the input voltage to the output voltage is 4:1. The power conversion circuit 1a includes a first switching unit and a second switching unit. The first switching unit includes a first switch group and a second switch group, which are electrically connected with each other. The first switch group includes a first switch S11. The second switch group includes a second switch S12. The second switching unit includes a third switch group and a fourth switch group. The third switch group includes a third switch Sr11. The fourth switch group includes a fourth switch Sr12. The third switch Sr11 is electrically connected with the first switch S11. The fourth switch Sr12 is electrically connected with the second switch S12. The first terminal of the third switch Sr11 and the first terminal of the fourth switch Sr12 are electrically connected with the first negative electrode V1−. During the switching cycle Ts, the on/off states of the first switch S11 and the fourth switch Sr12 are identical, and the on/off states of the second switch S12 and the third switch Sr11 are identical. The phase difference between the control signals for controlling the on/off states of the first switch S11 and the second switch S12 is 180 degrees.

The first capacitor C1 is electrically connected between the first positive electrode V1+ and the first negative electrode V1−. The second capacitor C2 is electrically connected between the second positive electrode V2+ and the second negative electrode V2−. The flying capacitor Cb11 is electrically connected to the first switch 11 and the third switch Sr11.

The magnetic element T-1a includes two first windings T11 and T12. In addition, the two first windings T11 and T12 are wound around the same magnetic core to result in an electromagnetic coupling effect. The first winding T11 is electrically connected between the flying capacitor Cb11 and the second positive electrode V2+. The first winding T12 is electrically connected between the second switch S12 and the second positive electrode V2+. The second terminal of the first winding T11 and the second terminal of the first winding T12 (i.e., opposite-polarity terminals) are electrically connected with each other and further connected to the second positive electrode V2+. The turn ratio between the first winding T11 and the first winding T12 is 1:1. The ratio of the input voltage to the output voltage is 4:1. In the switching cycle Ts, the resonant effect between the flying capacitor Cb11 and the equivalent leakage inductor of the magnetic element T-1a generates a resonant current. The resonant current has a resonant period and a resonant frequency. The resonant current transfers electric energy to the first terminal or the second terminal of the power conversion circuit 1a.

Please refer to FIG. 1B. The power conversion circuit has an N:1 asymmetric, resonant and duty-cycle-expandable circuit topology. In comparison with the embodiment of FIG. 1A, the magnetic element T-1b of the power conversion circuit 1b as shown in FIG. 1B further includes a second winding T13. The two first windings T11, T12 and the second winding T13 are electromagnetically coupled with each other through the same magnetic core (not shown). The first winding T11 is electrically connected between the flying capacitor Cb11 and the second positive electrode V2+. The first winding T12 is electrically connected between the second switch S12 and the second positive electrode V2+. The second winding T13 and the flying capacitor Cb11 are connected between the first switch S11 and the first winding T11. The second terminal of the first winding T11 and the second terminal of the first winding T12 (i.e., opposite-polarity terminals) are electrically connected with each other and further connected to the second positive electrode V2+. The opposite-polarity terminals of the second winding T13 and the first winding T11 are electrically connected with each other. The turn ratio between the second winding T13, the first winding T11 and the first winding T12 is N:1:1, wherein N is a positive value, and preferably a positive integer. Due to the arrangement of the second winding T13, the flexibility of designing the ratio of the input voltage to the output voltage in the power conversion circuit is enhanced and the applications of the power conversion circuit are expanded. In the switching cycle Ts, the resonant effect between the flying capacitor Cb11 and the equivalent leakage inductor of the magnetic element T-1b generates a resonant current. The resonant current has a resonant period and a resonant frequency. The resonant current transfers electric energy to the first terminal or the second terminal of the power conversion circuit 1b.

As shown in FIG. 2A, the power conversion circuit 2a has a symmetric circuit topology, in which the ratio of the input voltage to the output voltage is 4:1. The power conversion circuit 2a includes two first switching units and a second switching unit. Each first switching unit includes a first switch group and a second switch group, which are electrically connected with each other. In one of the two first switching units, the first switch group includes a first switch S21, and the second switch group includes a fifth switch S22. In the other first switching unit, the first switch group includes a fourth switch S23, and the second switch group includes a second switch S24. The second switching unit includes a third switch group and a fourth switch group. The third switch group includes a third switch Sr22, and the fourth switch group includes a sixth switch Sr21. The first terminal of the first switch S21 is electrically connected with the first positive electrode V1+. The second terminal of the first switch S21 is electrically connected to the first terminal of the fifth switch S22. The second terminal of the fifth switch S22 is electrically connected with the first terminal of the sixth switch Sr21. The second terminal of the sixth switch Sr21 is electrically connected with the second negative electrode V2−. The first terminal of the fourth switch S23 is electrically connected with the first positive electrode V1+. The second terminal of the fourth switch S23 is electrically connected with the first terminal of the second switch S24. The second terminal of the second switch S24 is electrically connected with the first terminal of the third switch Sr22. The second terminal of the third switch Sr22 is electrically connected with the second negative electrode V2−. The first flying capacitor Cb21 is electrically connected between the second terminal of the first switch S21 and the first terminal of the third switch Sr22. The second flying capacitor Cb22 is electrically connected between the second terminal of the fourth switch S23 and the first terminal of the sixth switch Sr21. The first capacitor C1 is electrically connected between the first positive electrode V1+ and the first negative electrode V1−. The second capacitor C2 is electrically connected between the second positive electrode V2+ and the second negative electrode V2−.

In the switching cycle Ts, the on/off states of the first switch S21, the second switch S24 and the sixth switch Sr21 are identical, and the on/off states of the fourth switch S23, the fifth switch S22 the third switch Sr22 are identical. The phase difference between the control signals for controlling the on/off states of the first switch S21 and the fourth switch S23 is 180 degrees.

The magnetic element T-2a includes two first windings T21 and T22. In addition, the two first windings T21 and T22 are wound around the same magnetic core to result in an electromagnetic coupling effect. The second terminals of the two first windings T21 and T22 (i.e., opposite-polarity terminals) are electrically connected with each other and further connected to the second positive electrode V2+. The first terminal of the first winding T21 is electrically connected with the second terminal of the fifth switch S22 and the first terminal of the sixth switch Sr21. The first terminal of the first winding T22 is electrically connected with the second terminal of the second switch S24 and the first terminal of the third switch Sr22. The turn ratio between the first winding T21 and the first winding T22 is 1:1. The ratio of the input voltage to the output voltage of the power conversion circuit 2a is 4:1. In the switching cycle Ts, the resonant effect between the first flying capacitor Cb21, the second flying capacitor Cb22 and the equivalent leakage inductor of the magnetic element T-2a generates a resonant current. The resonant current has a resonant period and a resonant frequency. The resonant current transfers electric energy to the first terminal or the second terminal of the power conversion circuit 2a.

Please refer to FIG. 2B. The power conversion circuit has an N:1 symmetric, resonant and duty-cycle-expandable circuit topology. In comparison with FIG. 2A, the magnetic element T-2b further includes two second windings T23 and T24. These windings are wound around the same magnetic core to result in an electromagnetic coupling effect. The second terminals of the two first windings T21 and T22 (i.e., opposite-polarity terminals) are electrically connected with each other and further connected to the second positive electrode V2+. The first terminal of the first winding T21 is electrically connected with the second terminal of the fifth switch S22 and the first terminal of the sixth switch Sr21. The first terminal of the first winding T22 is electrically connected with the second terminal of the second switch S24 and the first terminal of the third switch Sr22. The serially-connected structure of the second winding T23 and the second flying capacitor Cb22 is connected between the second terminal of the fourth switch S23 and the second terminal of the fifth switch S22. The serially-connected structure of the second winding T24 and the first flying capacitor Cb21 is connected between the second terminal of the first switch S21 and the second terminal of the second switch S24. The turn ratio between the second winding T23, the second winding T24, the first winding T21 and the first winding T22 is N:N:1:1, wherein N is a positive value, and preferably a positive integer. The ratio of the input voltage to the output voltage of the power conversion circuit 2b is N:1. In the switching cycle, the resonant effect between the first flying capacitor Cb21, the second flying capacitor Cb22 and the equivalent leakage inductor of the magnetic element T-2b generates a resonant current. The resonant current has a resonant period and a resonant frequency. The resonant current transfers electric energy to the first terminal or the second terminal of the power conversion circuit 2b.

As shown in FIG. 2C, the power conversion circuit 2c has a symmetric circuit topology, in which the ratio of the input voltage to the output voltage is 4:1. The power conversion circuit 2c includes two first switching units and a second switching unit. Each first switching unit includes a first switch group and a second switch group, which are electrically connected with each other. In one of the two first switching units, the first switch group includes a switch S21, and the second switch group includes two switches S22a and S22b. In the other first switching unit, the first switch group includes a switch S23, and the second switch group includes two switches S24a and S24b. The second switching unit includes a third switch group and a fourth switch group. The third switch group includes a switch Sr22, and the fourth switch group includes a switch Sr21. The first terminal of the switch S21 is electrically connected to the first positive electrode V1+. The second terminal of the switch S21 is electrically connected with the first terminal of the switch S22a. The second terminal of the switch S22a is electrically connected with the first terminal of the switch S24b. The second terminal of the switch S24b is electrically connected to the first terminal of switch Sr22. The second terminal of the switch Sr22 is electrically connected with the second negative electrode V2−. The first terminal of the switch S23 is electrically connected with the first positive electrode V1+. The second terminal of the switch S23 is electrically connected with the first terminal of the switch S24a. The second terminal of the switch S24a is electrically connected with the first terminal of the switch S22b. The second terminal of switch S22b is electrically connected with the first terminal of the switch Sr21. The second terminal of the switch Sr21 is electrically connected with the second negative electrode V2−. The first flying capacitor Cb21 is electrically connected between the second terminal of the switch S21 and the first terminal of the switch Sr22. The second flying capacitor Cb22 is electrically connected between the second terminal of the switch S23 and the first terminal of the switch Sr21. The second terminal of the switch S22a is electrically connected with the second terminal of the switch S24a. The first capacitor C1 is electrically connected between the first positive electrode V1+ and the first negative electrode V1−. The second capacitor C2 is electrically connected between the second positive electrode V2+ and the second negative electrode V2−.

In the switching cycle Ts, the on/off states of the switch S21, the switch S24a, the switch S24b and the switch Sr21 are identical, and the on/off states of the switch S23, the switch S22a, the switch S22b and the switch Sr22 are identical. The phase difference between the control signals for controlling the on/off states of the switch S21 and the switch S23 is 180 degrees.

The magnetic element T-2c of the power conversion circuit 2c includes two first windings T21 and T22. In addition, the two first windings T21 and T22 are wound around the same magnetic core to result in an electromagnetic coupling effect. The second terminals of the two first windings T21 and T22 (i.e., opposite-polarity terminals) are electrically connected with each other and further connected to the second positive electrode V2+. The first terminal of the first winding T21 is electrically connected with the second terminal of the switch S22b and the first terminal of the switch Sr21. The first terminal of the first winding T22 is electrically connected with the second terminal of the switch S24b and the first terminal of the switch Sr22. The turn ratio between the first winding T21 and the first winding T22 is 1:1. The ratio of the input voltage to the output voltage of the power conversion circuit 2c is 4:1. In the switching cycle Ts, the resonant effect between the first flying capacitor Cb21, the second flying capacitor Cb22 and the equivalent leakage inductor of the magnetic element T-2c generates a resonant current. The resonant current has a resonant period and a resonant frequency. The resonant current transfers electric energy to the first terminal or the second terminal of the power conversion circuit 2c.

In comparison with the embodiment of FIG. 2C, the magnetic element T-2d as shown in FIG. 2D includes two first windings T21, T22 and two second windings T23, T24.

These windings are wound around the same magnetic core to result in an electromagnetic coupling effect. The second terminals of the two first windings T21 and T22 (i.e., opposite-polarity terminals) are electrically connected with each other and further connected to the second positive electrode V2+. The first terminal of the first winding T21 is electrically connected with the second terminal of the switch S22b and the first terminal of the switch Sr21. The first terminal of the first winding T22 is electrically connected with the second terminal of the switch S24b and the first terminal of the switch Sr22. The serially-connected structure of the second winding T23 and the second flying capacitor Cb22 is connected between the second terminal of the switch S23 and the second terminal of the switch S22b. The serially-connected structure of the second winding T24 and the first flying capacitor Cb21 is connected between the second terminal of the switch S21 and the second terminal of the switch S24b. The turn ratio between the second winding T23, the second winding T24, the first winding T21 and the first winding T22 is N:N:1:1, wherein N is a positive value, and preferably a positive integer. The ratio of the input voltage to the output voltage of the power conversion circuit 2d is N:1. In the switching cycle Ts, the resonant effect between the first flying capacitor Cb21, the second flying capacitor Cb22 and the equivalent leakage inductor of the magnetic element T-2d generates a resonant current. The resonant current has a resonant period and a resonant frequency. The resonant current transfers electric energy to the first terminal or the second terminal of the power conversion circuit 2d.

Generally, the conventional power conversion circuit with resonant and duty-cycle-expandable circuit topology has a problem of controlling the power conversion circuit to start and pre-charging the flying capacitor. For overcoming the drawbacks of the conventional technology, the present invention further provides a power conversion system. The power conversion system includes a power conversion circuit and a start circuit. The power conversion circuit has the circuitry structure of any of the power conversion circuits 1a, 1b, 2a, 2b, 2c and 2d. The start circuit is used for pre-charging the flying capacitor and the output capacitor of the power conversion circuit.

Figure 3:
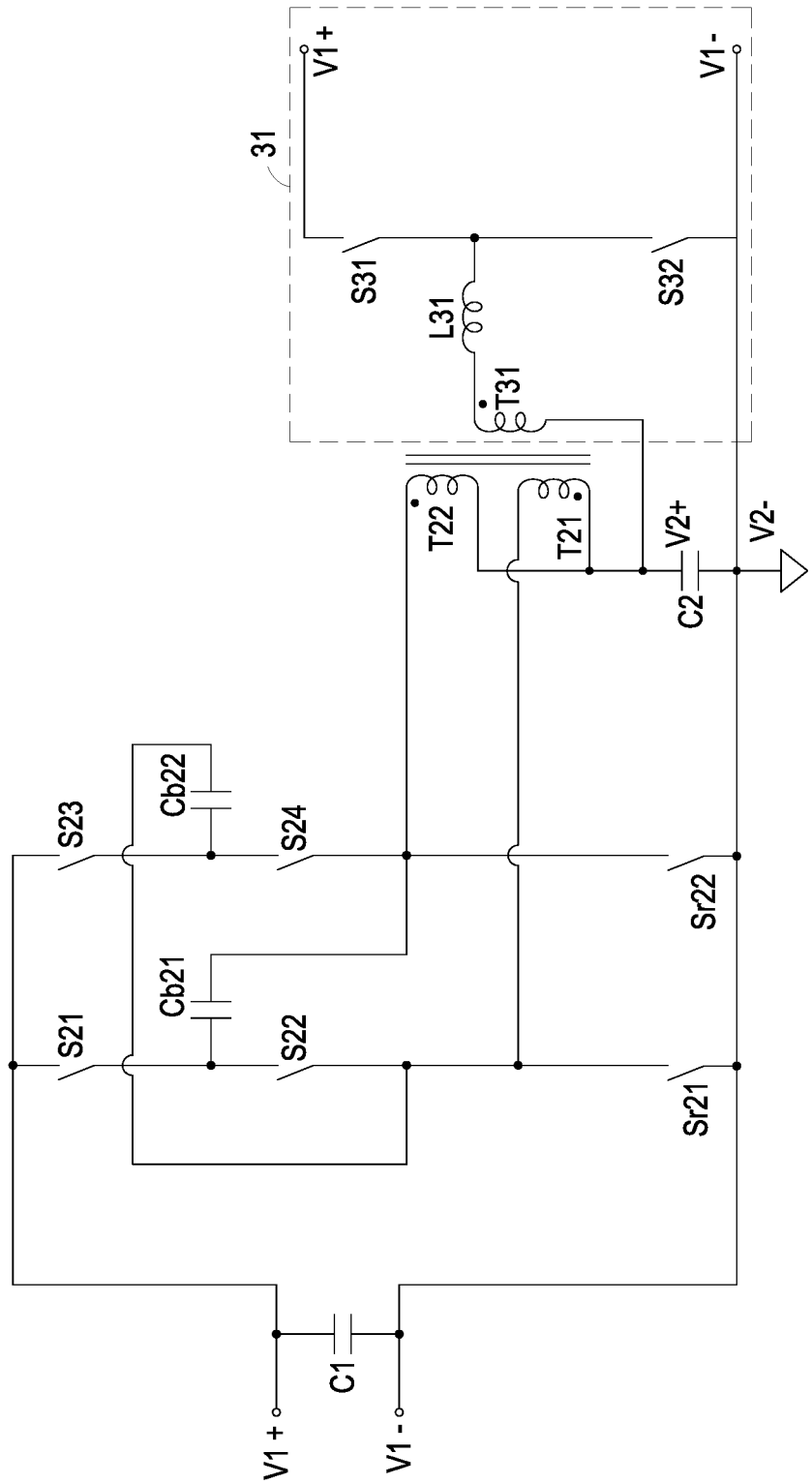
FIG. 3 is a schematic circuit diagram illustrating a power conversion system according to a first embodiment of the present invention.

FIG. 3 is a schematic circuit diagram illustrating a power conversion system according to a first embodiment of the present invention. In this embodiment, the power conversion system 3 includes a power conversion circuit 2a and a start circuit 31. The circuitry structure of the power conversion circuit 2a is identical to that of FIG. 2A. It is noted that the power conversion circuit 2a may be replaced by any of the power conversion circuit as shown in FIG. 2B, 2C or 2D.

The start circuit 31 can simultaneously pre-charge the flying capacitor and the output capacitor of the power conversion circuit. The start circuit 31 includes a third winding T31, an inductor L31 and a switch bridge arm. The switch bridge arm includes an upper switch S31 and a lower switch S32, which are electrically connected with each other. The control signals for controlling the upper switch S31 and the lower switch S32 are complementary to each other. The input terminal of the switch bridge arm is electrically connected with the first terminal of the power conversion circuit 2a. That is, the two input points (i.e., the input terminal of the switch bridge arm) are collaboratively formed as the input terminal of the start circuit 31. The input terminal of the start circuit 31 is electrically connected with the first positive electrode V1+ and the first negative electrode V1− of the first terminal of the power conversion circuit 2a. The third winding T31 is electromagnetically coupled with the two first windings T21 and T22. The first terminal of the serially-connected structure of the third winding T31 and the inductor L31 is connected with the midpoint of the switch bridge arm, i.e., the node between the upper switch S31 and the lower switch S32. The second terminal of the serially-connected structure of the third winding T31 and the inductor L31 is connected with the second positive electrode V2+. The turn ratio between the third winding T31, the first winding T21 and the first winding T22 is not restricted. In this embodiment, the turn ratio between the third winding T31, the first winding T21 and the first winding T22 is 1:1:1.

In an embodiment, the inductor L31 is an external inductor. Alternatively, in another embodiment, the inductor L31 is a leakage inductor that is electromagnetically coupled with the two first windings T21, T22 and the third winding T31. In an embodiment, the dotted terminal of the third winding T31 is electrically connected with the inductor L31. Alternatively, the dotted terminal of the third winding T31 is electrically connected with the second positive electrode V2+ of the power conversion circuit 2a.

In this embodiment, the first terminal of the power conversion system 3 (including the first positive electrode V1+ and the first negative electrode V1−) is the input voltage terminal, and the second terminal of the power conversion system 3 (including the second positive electrode V2+ and the second negative electrode V2−) is the output voltage terminal.

During a start process of the power conversion circuit (i.e., a charging state), the flying capacitor and the output capacitor of the power conversion circuit are simultaneously pre-charged by controlling the switches of the start circuit. After the start process of the power conversion circuit is completed, the switches of the power conversion circuit are in a normal working state. Meanwhile, the switches receive the corresponding control signals to perform the corresponding switching action.

If the second terminal voltage V2 is lower than a quarter of the first terminal voltage V1 and the terminal voltages of the two flying capacitors Cb21 and Cb22 are lower than twice the second terminal voltage V2, the power conversion system 3 is in the first charging state. FIGS. 4A, 4B, 4C and 4D are schematic circuit diagrams illustrating the operations of the power conversion system as shown in FIG. 3 in a first charging state, in which the first terminal is the input voltage terminal and the second terminal is the output voltage terminal. FIG. 4E is a schematic timing waveform diagram illustrating the on/off states of associated switches in the power conversion system of FIG. 3 and associated current signals and voltage signals, in which the first terminal is the input voltage terminal and the second terminal is the output voltage terminal. The time period between the time point t0 and the time point t4 is equal to one switching cycle Ts, and the control signal has a duty cycle D.

Figure 4A:
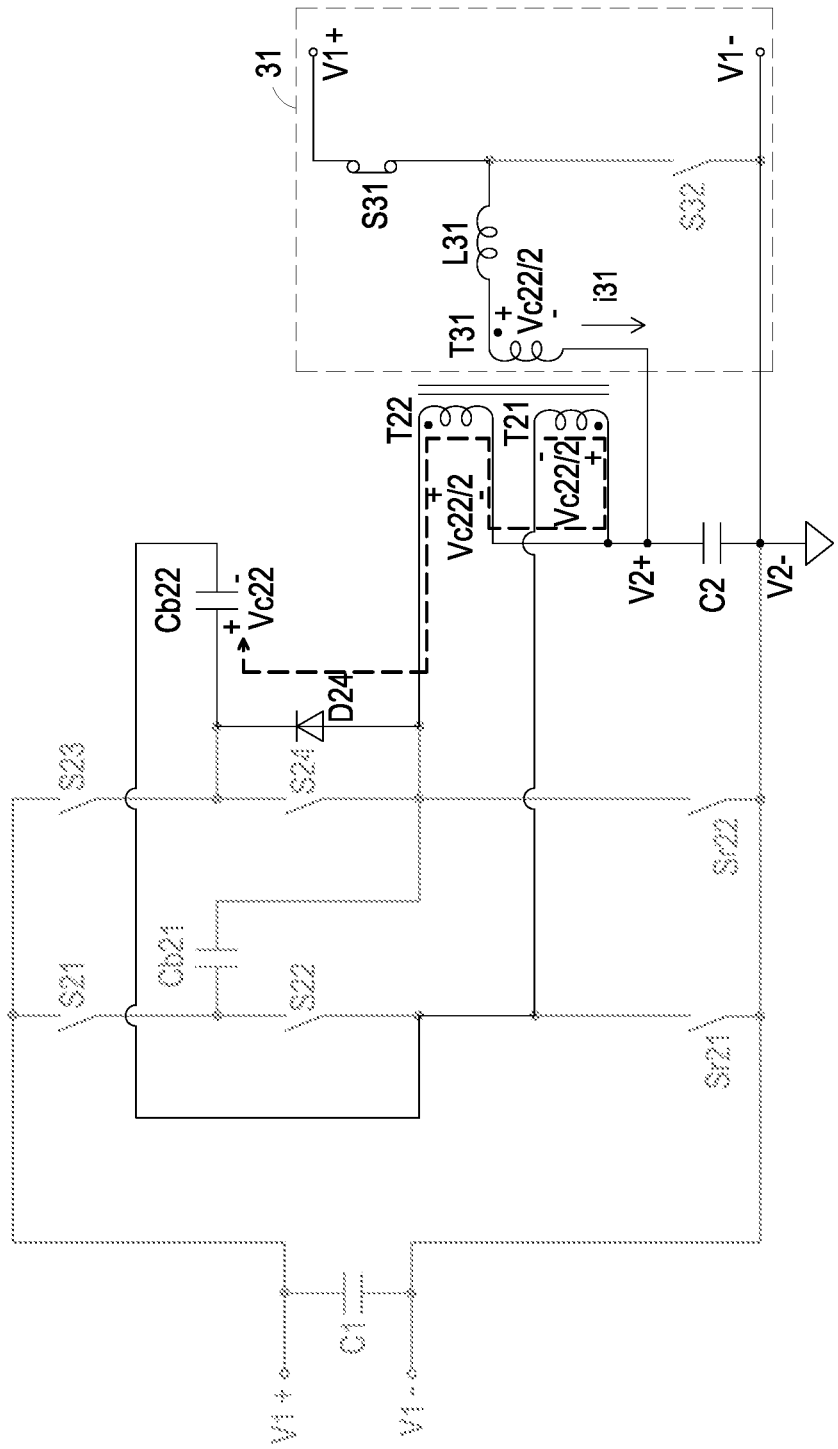
FIGS. 4A, 4B, 4C and 4D are schematic circuit diagrams illustrating the operations of the power conversion system as shown in FIG. 3 in a first charging state, in which the first terminal is the input voltage terminal and the second terminal is the output voltage terminal.
Figure 4B:
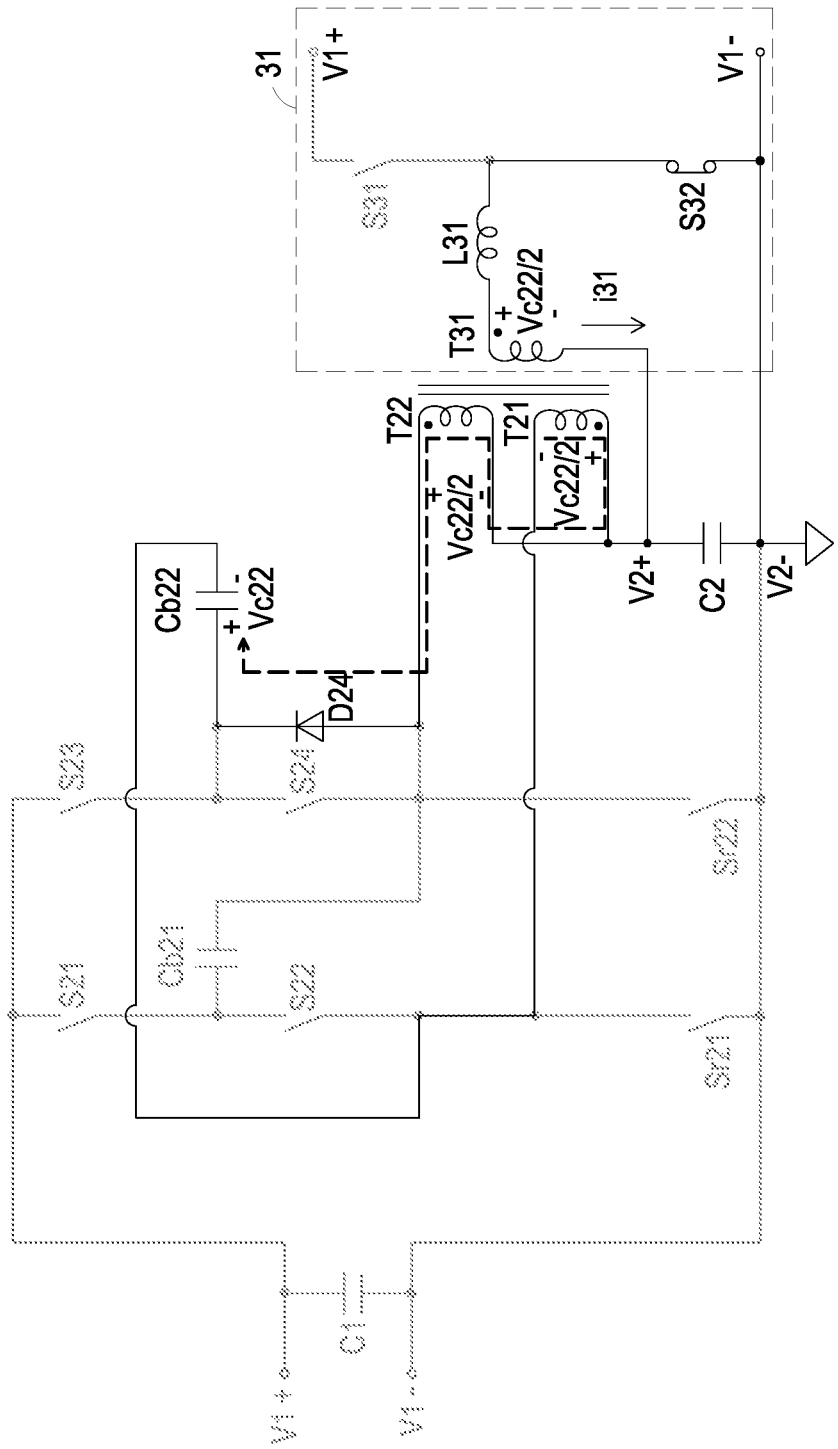
Figure 4C:
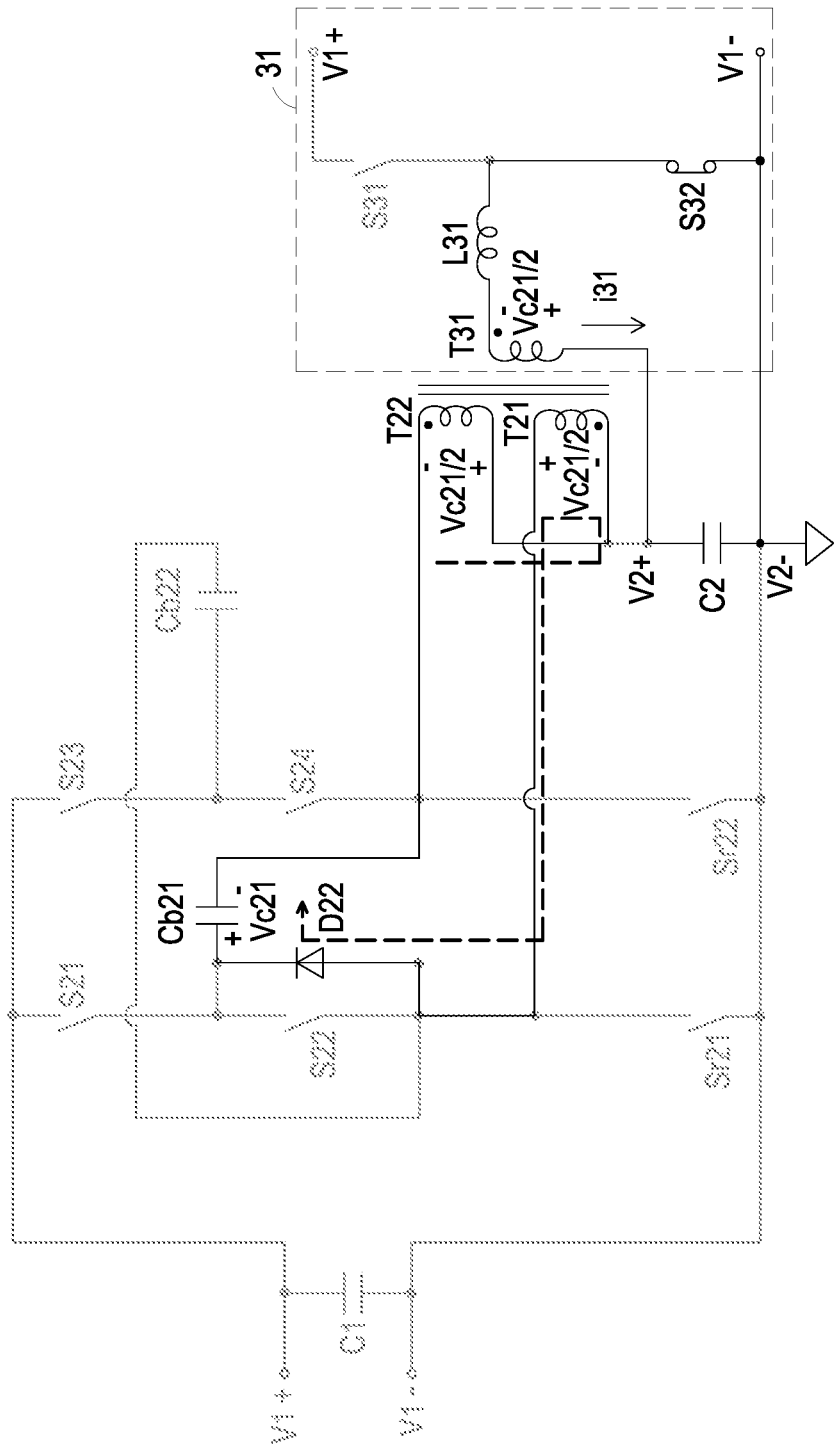
Figure 4D:
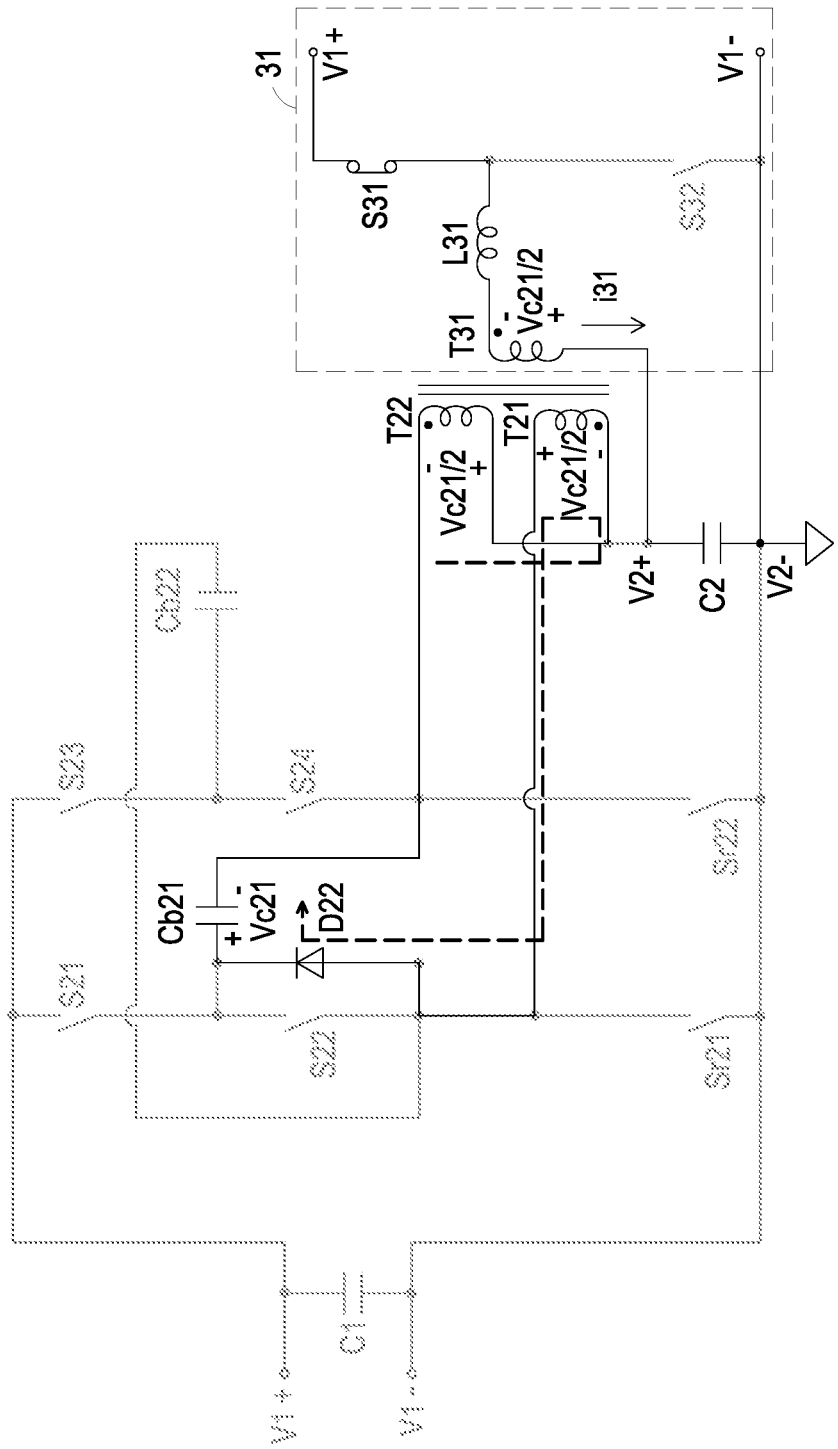
Figure 4E:
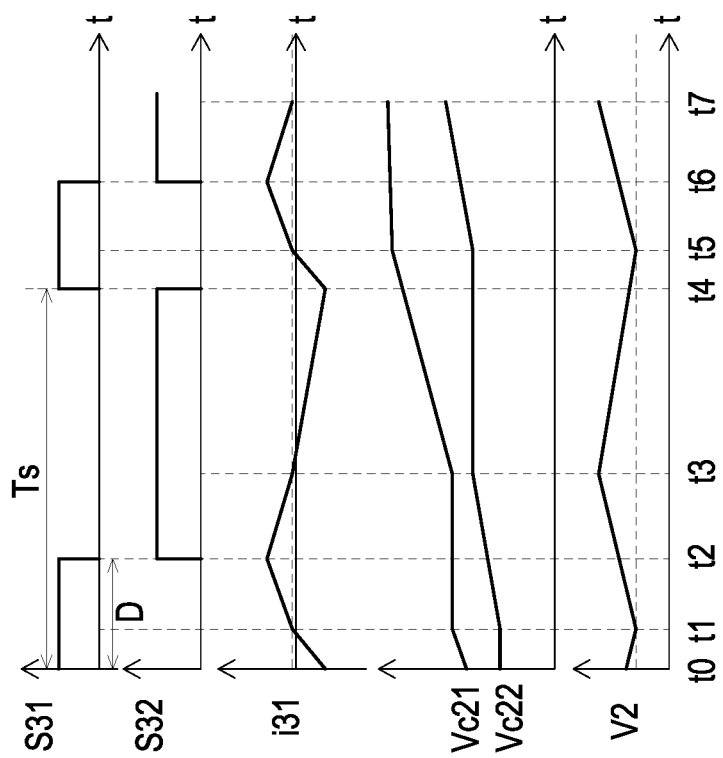
FIG. 4E is a schematic timing waveform diagram illustrating the on/off states of associated switches in the power conversion system of FIG. 3 and associated current signals and voltage signals, in which the first terminal is the input voltage terminal and the second terminal is the output voltage terminal.

Please refer to FIGS. 4A and 4E. In the interval between the time point t1 and the time point t2, the upper switch S31 is turned on, and the lower switch S32 is turned off. At this time, the current i31 in the start circuit 31 flows through the upper switch S31 and the inductor L31 and the third winding T31. In addition, the current i31 rises linearly in the positive direction in the interval t1 to t2. Meanwhile, the parasitic diode D24 of the second switch S24 is turned on, and the terminal voltages of the first windings T21 and T22 are clamped to Vc22/2 by the terminal voltage Vc22 of the second flying capacitor Cb22 through the parasitic diode D24 of the second switch S24. Due to the electromagnetic coupling effect between the first windings T21 and T22 and the third winding T31, the terminal voltage of the third winding T31 is Vc22/2. Meanwhile, the second capacitor C2 is pre-charged by the current i31 of the starting circuit 31. Moreover, due to the electromagnetic coupling effect between the third winding T31 and the first windings T21 and T22, the second flying capacitor Cb22 is pre-charged by the first windings T21 and T22 through the parasitic diode D24 of the second switch S24.

Please refer to FIGS. 4B and 4E. In the interval between the time point t2 and the time point t3, the upper switch S31 is turned off, and the lower switch S32 is turned on. The current i31 in the start circuit 31 flows through the lower switch S32, the inductor L31 and the third winding T31. The current i31 decreases linearly in the positive direction. Moreover, the second capacitor C2 is pre-charged by the current i31 in the interval t2 to t3. Due to the electromagnetic coupling effect between the third winding T31 and the first windings T21 and T22, the second flying capacitor Cb22 is still pre-charged by the first windings T21 and T22 through the parasitic diode D24 of the second switch S24.

Please refer to FIGS. 4C and 4E. In the interval between the time point t3 and the time point t4, the lower switch S32 is turned on and the upper switch S31 is turned off. At this time, the current i31 in the start circuit 31 flows through the third winding T31, the inductor L31 and the lower switch S32. The current i31 rises linearly in the reverse direction in the interval t3 to t4. Meanwhile, the parasitic diode D22 of the fifth switch S22 is turned on, and the terminal voltages of the first windings T21 and T22 are clamped to Vc21/2 by the terminal voltage Vc21 of the first flying capacitor Cb21 through the parasitic diode D22 of the fifth switch S22. Due to the electromagnetic coupling effect between the first windings T21 and T22 and the third winding T31, the terminal voltage of the third winding T31 is Vc21/2. Meanwhile, due to the electromagnetic coupling effect between the third winding T31 and the first windings T21 and T22, the first flying capacitor Cb21 is pre-charged by the first windings T21 and T22 through the parasitic diode D22 of the fifth switch S22.

Please refer to FIGS. 4D and 4E. In the interval between the time point t4 and the time point t5 (corresponding to the interval t0 to t1), the lower switch S32 is turned off, and the upper switch S31 is turned on. At this time, the current i31 in the start circuit 31 flows through the upper switch S31, the inductor L31 and the third winding T31. The current i31 rises linearly in the reverse direction in the interval t4 to t5. Due to the electromagnetic coupling effect between the third winding T31 and the first windings T21 and T22, the first flying capacitor Cb21 is still pre-charged by the first windings T21 and T22 through the parasitic diode D22 of the fifth switch S22. The operations of the start circuit in the other switching cycle are similar to those in the time interval t0 to t4, and are not redundantly described herein. Consequently, the terminal voltages of the first flying capacitor Cb21, the second flying capacitor Cb22 and the second capacitor C2 can be charged by the start circuit 31.

If the terminal voltages of the first flying capacitor Cb21 and the second flying capacitor Cb22 are equal to or slightly greater than twice the terminal voltage V2 of the second capacitor C2, the power conversion system 3 enters a second charging state. FIGS. 5A, 5B, 5C and 5D are schematic circuit diagrams illustrating the operations of the power conversion system as shown in FIG. 3 in a second charging state, in which the first terminal is the input voltage terminal and the second terminal is the output voltage terminal. The waveform of associated signal for controlling the start circuit 31 is similar to that of FIG. 4E.

Figure 5A:
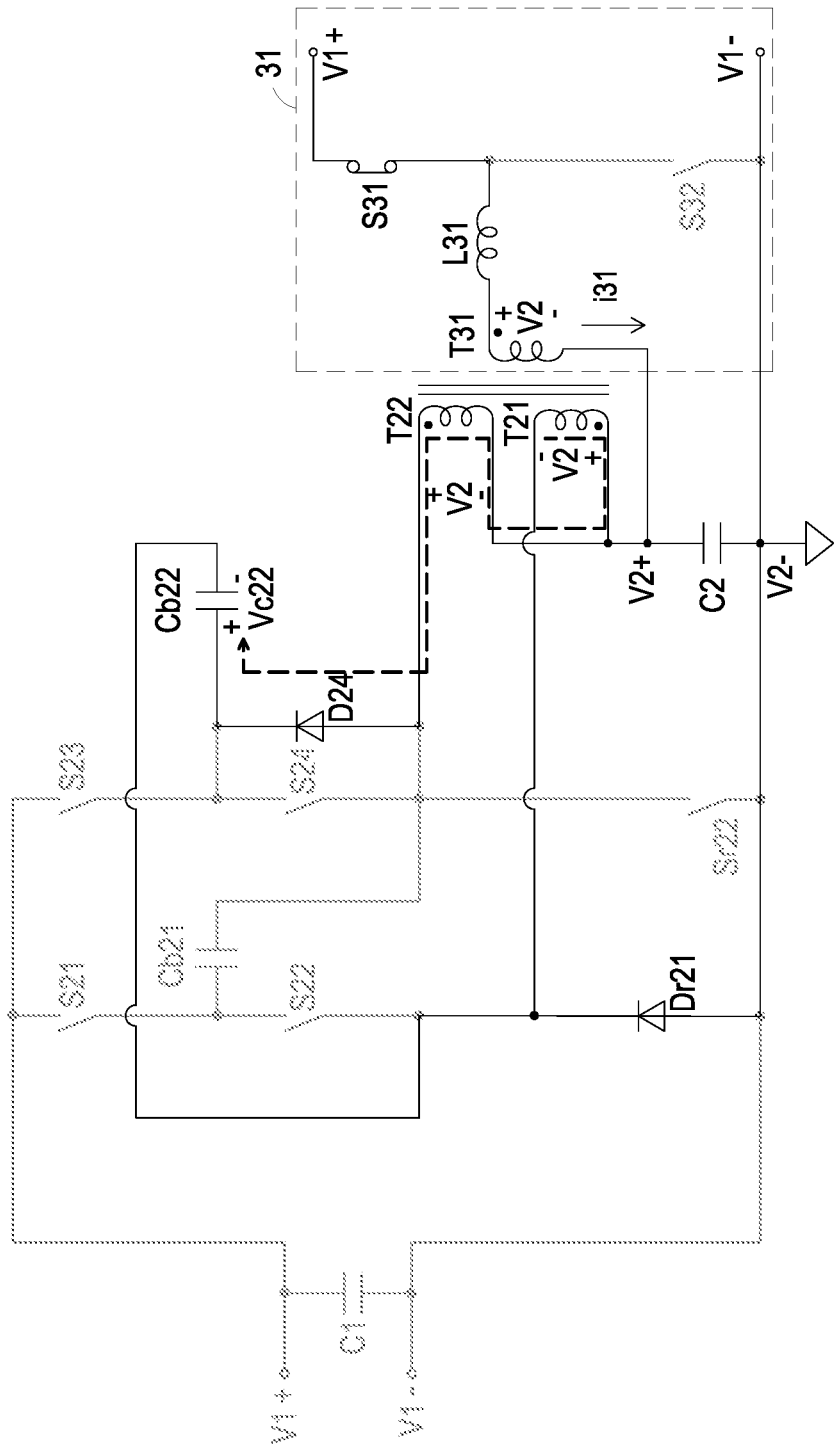
FIGS. 5A, 5B, 5C and 5D are schematic circuit diagrams illustrating the operations of the power conversion system as shown in FIG. 3 in a second charging state, in which the first terminal is the input voltage terminal and the second terminal is the output voltage terminal.

Please refer to FIGS. 5A and 4E. In the interval between the time point t1 and the time point t2, the upper switch S31 is turned on, and the lower switch S32 is turned off. At this time, the current i31 in the start circuit 31 flows through the upper switch S31 and the inductor L31 and the third winding T31. In addition, the current i31 rises linearly in the positive direction in the interval t1 to t2. Meanwhile, the parasitic diode Dr21 of the sixth switch Sr21 is turned on, and the terminal voltage of the first winding T21 is clamped to V2 by the terminal voltage V2 of the second capacitor C2. Due to the electromagnetic coupling effect between the first windings T21 and T22 and the third winding T31, the terminal voltage of the first winding T22 is also clamped to V2 and the terminal voltage of the third winding T31 is clamped to V2. Moreover, the second flying capacitor Cb22 is pre-charged by the first windings T21 and T22 through the parasitic diode D24 of the second switch S24.

Figure 5B:
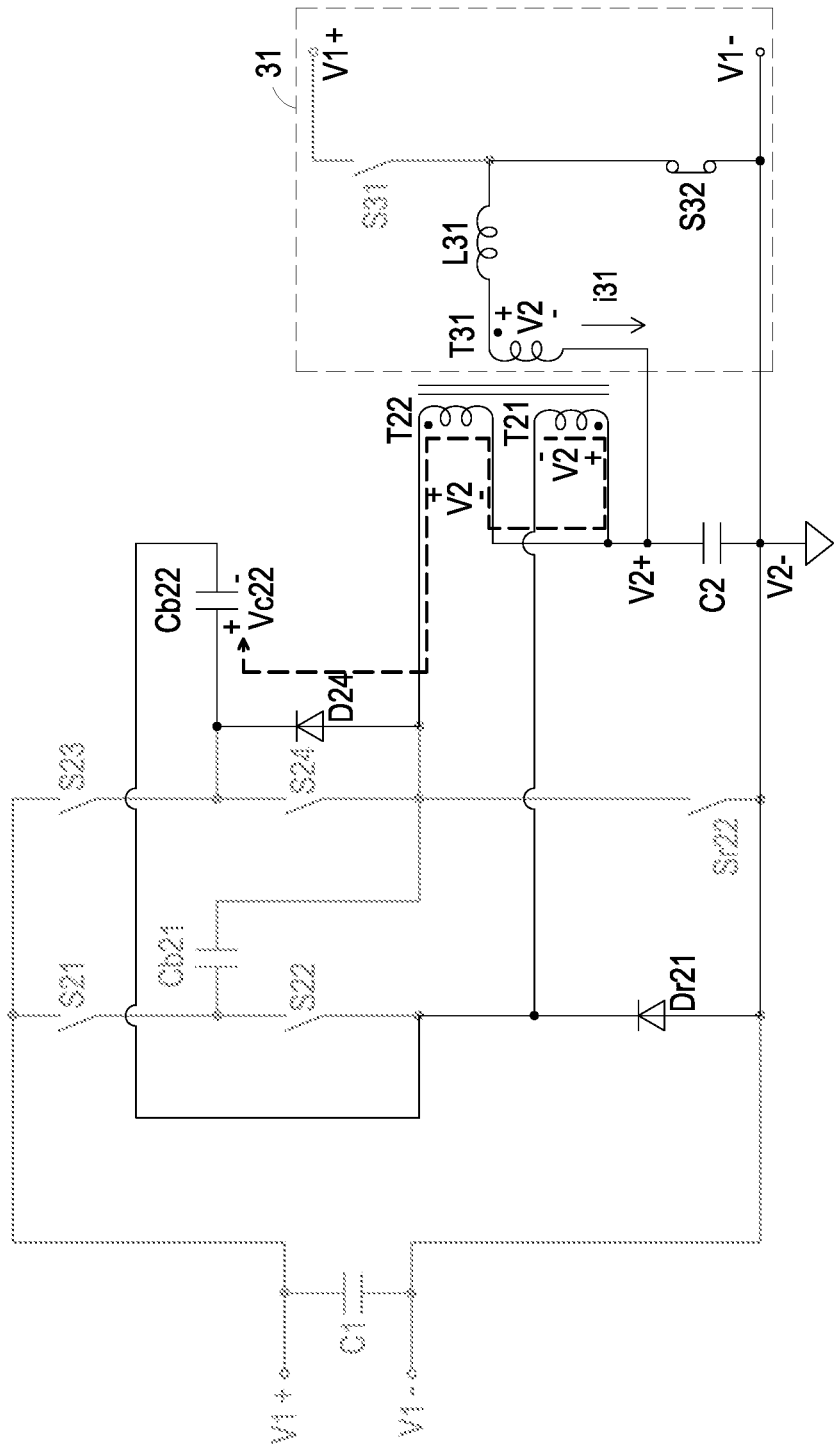

Please refer to FIGS. 5B and 4E. In the interval between the time point t2 and the time point t3, the upper switch S31 is turned off, the lower switch S32 is turned on. The current i31 in the start circuit 31 flows through the lower switch S32, the inductor L31 and the third winding T31. The current i31 decreases linearly in the positive direction. Moreover, the second capacitor C2 is pre-charged by the current i31 in the interval t2 to t3. Due to the electromagnetic coupling effect between the third winding T31 and the first windings T21 and T22, the second flying capacitor Cb22 is still pre-charged by the first windings T21 and T22 through the parasitic diode D24 of the second switch S24.

Figure 5C:
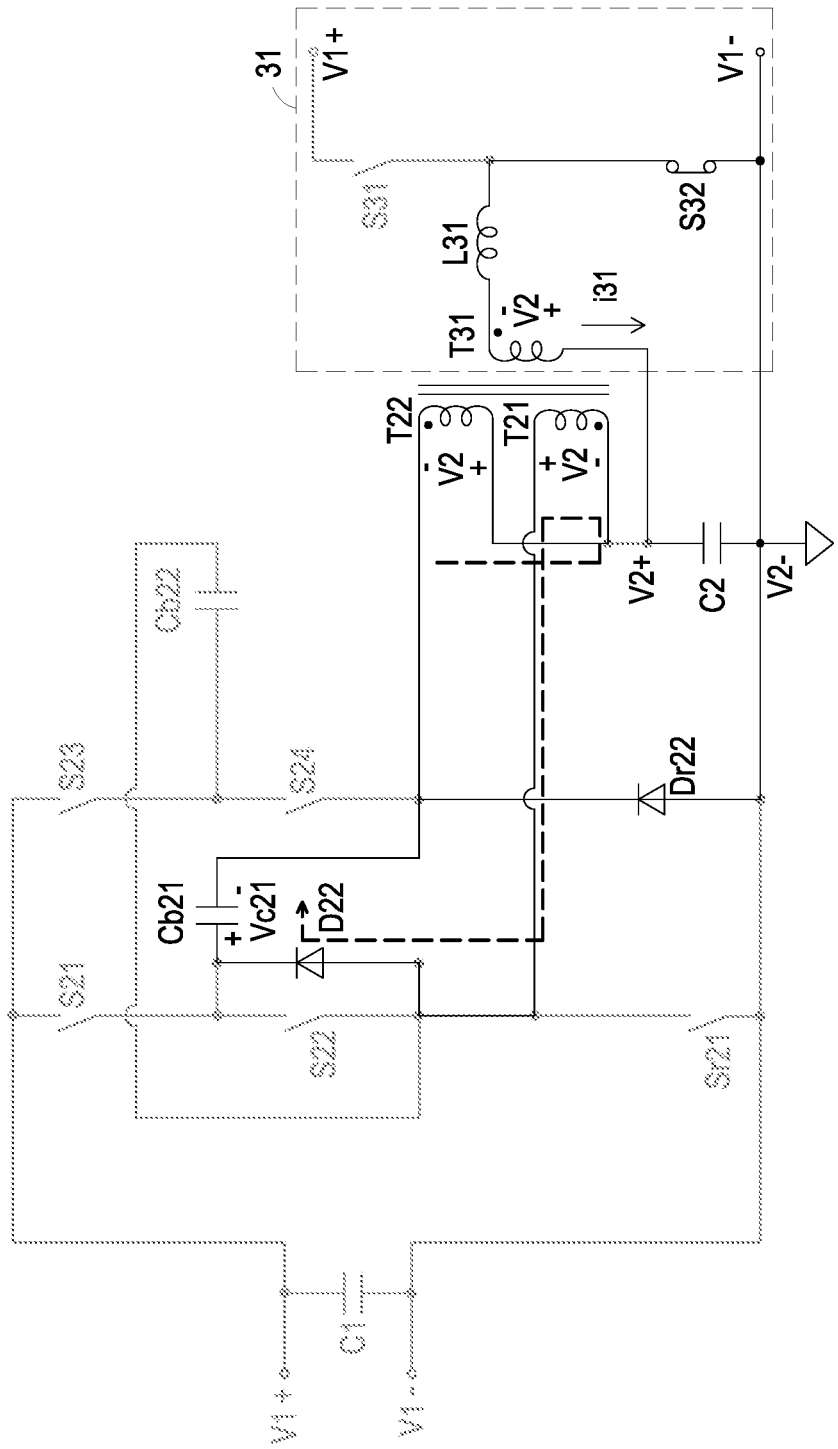

Please refer to FIGS. 5C and 4E. In the interval between the time point t3 and the time point t4, the lower switch S32 is turned on and the upper switch S31 is turned off. At this time, the current i31 in the start circuit 31 flows through the third winding T31, the inductor L31 and the lower switch S32. The current i31 rises linearly in the reverse direction in the interval t3 to t4. Meanwhile, the parasitic diode Dr22 of the third switch Sr22 is turned on, and the terminal voltages of the first winding T22 is clamped to V2 by the terminal voltage V2 of the second capacitor C2. Due to the electromagnetic coupling effect between the first windings T21 and T22 and the third winding T31, the terminal voltage of the first winding T21 is also clamped to V2 and the terminal voltage of the third winding T31 is clamped to V2. Meanwhile, due to the electromagnetic coupling effect between the third winding T31 and the first windings T21 and T22, the first flying capacitor Cb21 is pre-charged by the first windings T21 and T22 through the parasitic diode D22 of the fifth switch S22.

Figure 5D:
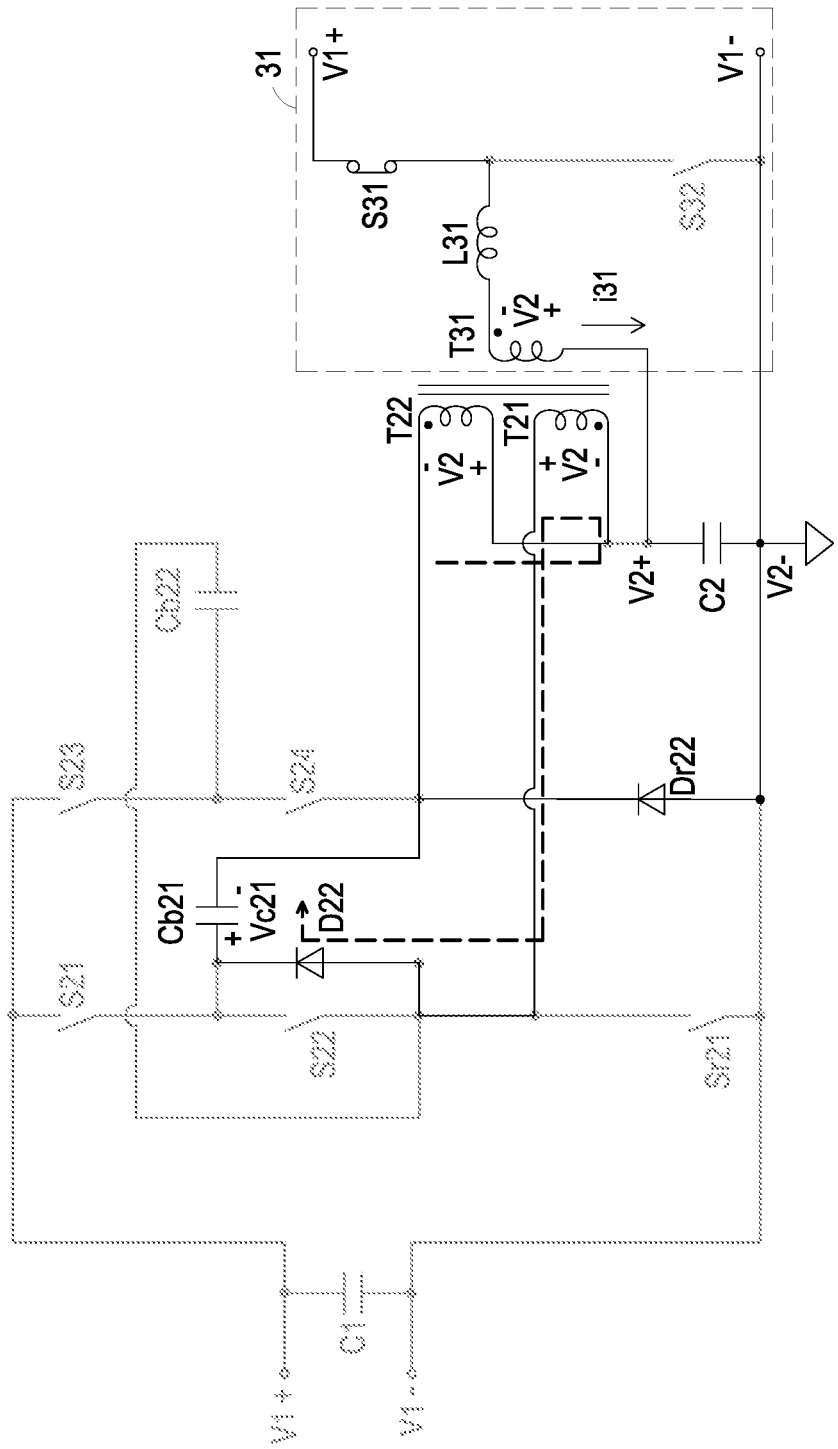

Please refer to FIGS. 5D and 4E. In the interval between the time point t4 and the time point t5 (corresponding to the interval t0 to t1), the lower switch S32 is turned off, and the upper switch S31 is turned on. At this time, the current i31 in the start circuit 31 flows through the upper switch S31, the inductor L31 and the third winding T31. The current i31 rises linearly in the reverse direction in the interval t4 to t5. Due to the electromagnetic coupling effect between the third winding T31 and the first windings T21 and T22, the first flying capacitor Cb21 is still pre-charged by the first windings T21 and T22 through the parasitic diode D22 of the fifth switch S22. The operations of the start circuit in the other switching cycle are similar to those in the time interval t0 to t4, and are not redundantly described herein. Consequently, the terminal voltages of the first flying capacitor Cb21, the second flying capacitor Cb22 and the second capacitor C2 can be charged by the start circuit 31.

Figure 6A:
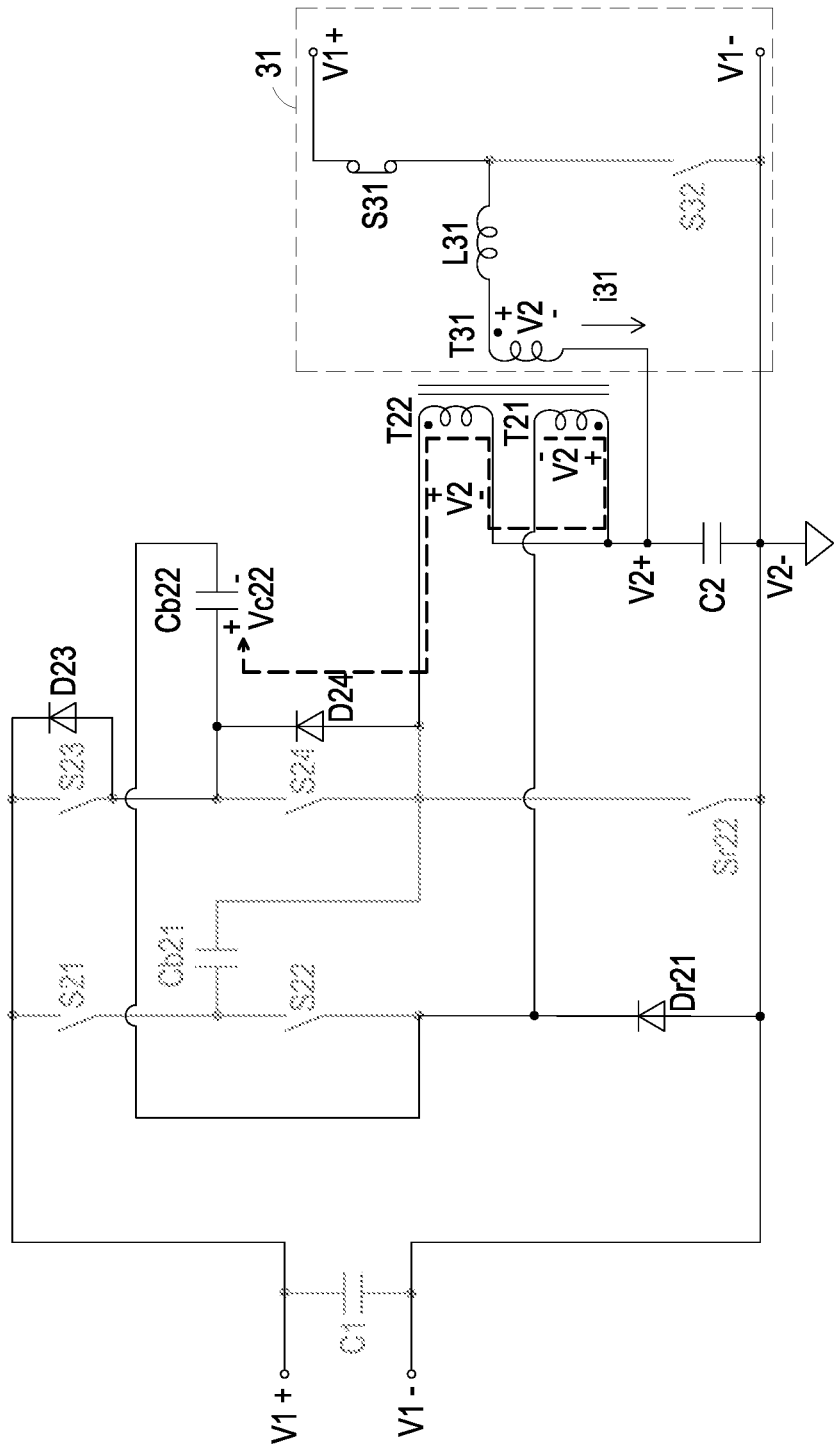
FIGS. 6A and 6B are schematic circuit diagrams illustrating the operations of the power conversion system as shown in FIG. 3 in a third charging state, in which the first terminal is the input voltage terminal and the second terminal is the output voltage terminal.
Figure 6B:
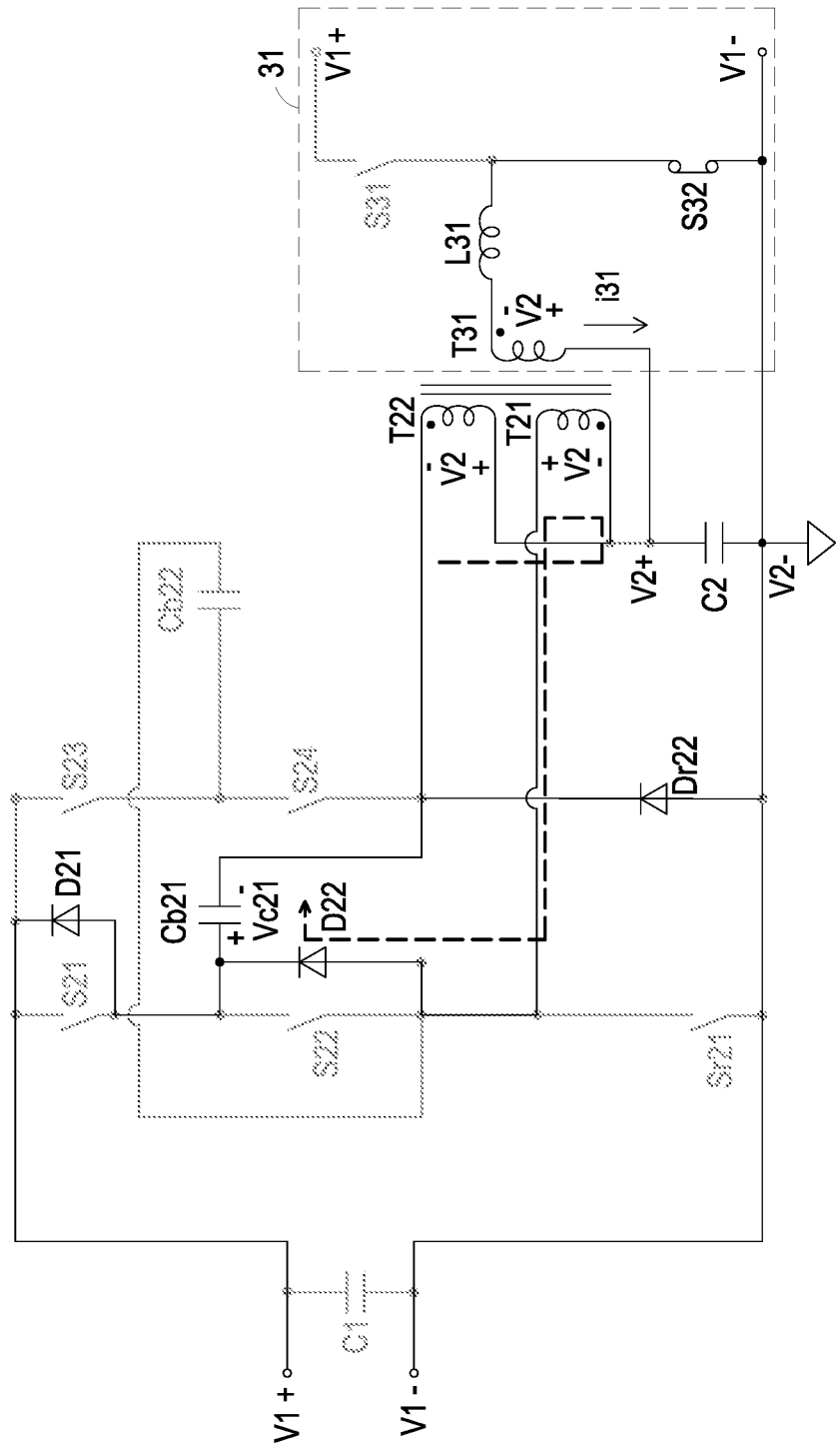

If the sum of the terminal voltage of the first flying capacitor Cb21 or the second flying capacitor Cb22 and twice the terminal voltage V2 of the second capacitor C2 is equal to the first terminal voltage V1 (i.e., the input terminal voltage of the power conversion system 3), the power conversion system 3 is in a third charging state. FIGS. 6A and 6B are schematic circuit diagrams illustrating the operations of the power conversion system as shown in FIG. 3 in a third charging state, in which the first terminal is the input voltage terminal and the second terminal is the output voltage terminal. The waveform of associated signal for controlling the start circuit 31 is similar to that of FIG. 4E.

When the power conversion system 3 is in the third charging state, the operating principles are similar to those of FIGS. 5A to 5D except for the following aspects. Please refer to FIG. 6A and FIG. 4E. In the interval between the time point t1 and the tine point t2, the parasitic diode D23 of the fourth switch S23 is turned on because the terminal voltage of the first flying capacitor Cb21 or the second flying capacitor Cb22 and the terminal voltage of the second capacitor C2 are increased. Consequently, the terminal voltage of the first flying capacitor Cb21 or the second flying capacitor Cb22 and the terminal voltage of the second capacitor C2 are clamped by the first terminal voltage V1.

Please refer to FIG. 6B and FIG. 4E. In the interval between the time point t3 and the tine point t4, the parasitic diode D21 of the first switch S21 is turned on because the terminal voltage of the first flying capacitor Cb21 or the second flying capacitor Cb22 and the terminal voltage of the second capacitor C2 are increased. Consequently, the terminal voltage of the first flying capacitor Cb21 or the second flying capacitor Cb22 and the terminal voltage of the second capacitor C2 are clamped by the first terminal voltage V1.

Since the terminal voltages of the first flying capacitor Cb21, the second flying capacitor Cb22 and the second capacitor C2 are not continuously increased, the function of starting the power conversion system 3 is achieved. Meanwhile, the start process of the power conversion system 3 is completed, and the power conversion system 3 enters the normal working state. At the same time, the on/off state of the at least one switch in the power conversion circuit is switched. Consequently, the electronic components in the power conversion system 3 (e.g., switches) will not be suffered from the impact of the large current, and the possibility of causing the damage of the electronic components is largely reduced. Moreover, the cost-effective electronic components can be employed.

Figure 7A:
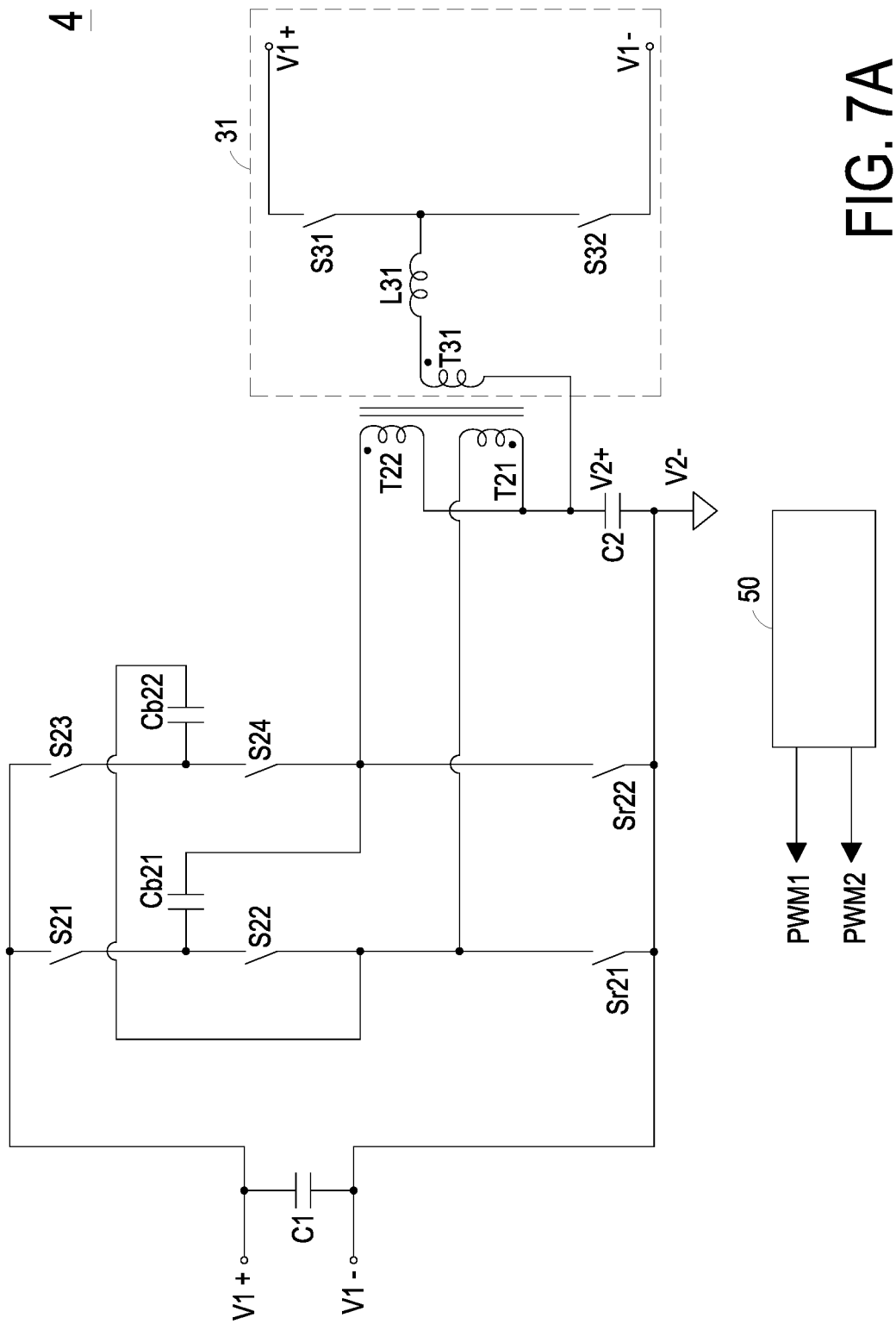
FIG. 7A is a schematic circuit diagram illustrating a power conversion system according to a second embodiment of the present invention.
Figure 7B:
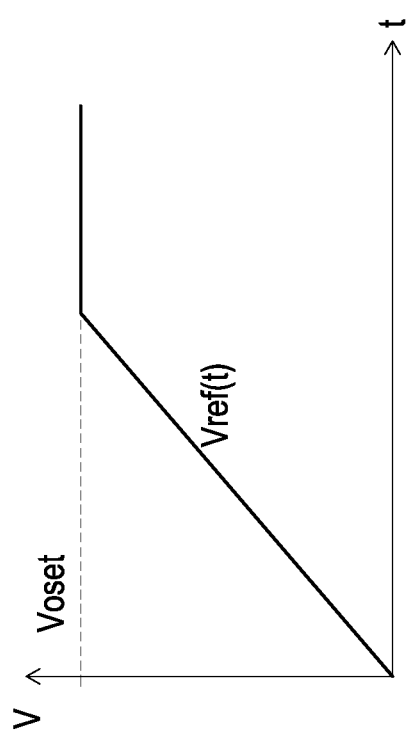
FIG. 7B schematically illustrates the change of a reference voltage for a control circuit of the power conversion system as shown in FIG. 7A.

FIG. 7A is a schematic circuit diagram illustrating a power conversion system according to a second embodiment of the present invention. FIG. 7B schematically illustrates the change of a reference voltage for a control circuit of the power conversion system as shown in FIG. 7A. In comparison with the power conversion system 3 of the first embodiment, the power conversion system 4 of this embodiment further includes a control circuit 50. The control circuit 50 issues two control signals PWM1 and PWM2. The upper switch S31 of the start circuit 31 is controlled according to the control signal PWM1. The lower switch S32 of the start circuit 31 is controlled according to the control signal PWM2. Consequently, the voltage across the first terminal and the second terminal of the serially-connected structure of the third winding T31 and the inductor L31 is an alternating voltage.

In case that control signals PWM1 and PWM2 have complementary duty cycles, the starting performance and efficiency of the power conversion system are enhanced. In some embodiments, the duty cycles of the control signals PWM1 and PWM2 are not complementary. The duty cycles of the control signals PWM1 and PWM2 may be adjusted according to the practical requirements as long as the voltage across the two terminals of the serially-connected structure of the third winding T31 and the inductor L31 is an alternating voltage.

The control circuit 50 can sample the voltage of the output voltage terminal of the power conversion system 4. Moreover, a reference voltage signal Vref(t) is preset in the control circuit 50. The control signals PWM1 and PWM2 are adjusted according to the result of comparing the sampled voltage of the output voltage terminal with the reference voltage signal Vref(t). As the reference voltage signal Vref(t) is gradually increased, the duty cycle of the control signal PWM1 is gradually increased from zero to 100%. Meanwhile, the two control signals PWM1 and PWM2 are complementary to each other. Alternatively, the duty cycles of the two control signals PWM1 and PWM2 can be gradually increased from zero to 50%. As the terminal voltages of the output voltage terminal, the first flying capacitor Cb21 and the second flying capacitors Cb22 are gradually increased, the soft-start function of the power conversion system 5 is achieved. When the voltage at the output voltage terminal of the power conversion system 4 is equal to the steady state voltage, i.e., the preset reference voltage Voset as shown in FIG. 7B, the start process of the power conversion system 4 is completed. When the start process of the power conversion system 4 is completed, the on/off state of the at least one switch in the first switch unit and the second switch unit of the power conversion circuit is switched.

In another embodiment, the control circuit 50 does not sample the output voltage of the power conversion system 4. Moreover, the duty cycles of the control signals PWM1 and PWM2 from control circuit 50 are fixed. The upper switch S31 and the lower switch S32 are controlled according to the control signals PWM1 and PWM2, respectively. Consequently, the output capacitor, the first flying capacitor Cb21 and the second flying capacitors Cb22 are pre-charged, and the output voltage of the power conversion system 4 is increased. When the voltage at the output voltage terminal of the power conversion system 4 is equal to the steady state voltage, i.e., the preset reference voltage Voset, the start process of the power conversion system 4 is completed. When the start process of the power conversion system 4 is completed, the on/off state of the at least one switch in the first switch unit and the second switch unit of the power conversion circuit is switched.

In an embodiment, the preset reference voltage Voset is in the range between 70% of the steady state voltage of the power conversion system 4 and the steady state voltage of the power conversion system 4, e.g., 70% of the steady state voltage of the power conversion system 4. In an embodiment, the start process of the power conversion system 4 is completed when the terminal voltage of each flying capacitor is charged to a voltage which is equal to or greater than 70% of the steady state voltage of the corresponding flying capacitor and the terminal voltage of the output capacitor is charged to a voltage which is equal to or greater than 70% of the steady state output voltage. At the same time, the on/off state of the at least one switch in the first switch unit and the second switch unit of the power conversion circuit is switched.

The power conversion circuit of the present invention has the function of converting the electric power in the bidirectional manner. In the following embodiment, the first terminal of the power conversion circuit is the output terminal, and the second terminal of the power conversion circuit is the input terminal. FIGS. 8A, 8B, 8C and 8D are schematic circuit diagrams illustrating the operations of the power conversion system as shown in FIG. 3 in a first charging state, in which the first terminal is the output voltage terminal and the second terminal is the input voltage terminal. FIG. 8E is a schematic timing waveform diagram illustrating the on/off states of associated switches in the power conversion system of FIG. 3 and associated current signals and voltage signals, in which the first terminal is the output voltage terminal and the second terminal is the input voltage terminal. In this embodiment, the first terminal of the power conversion system 3 (including the first positive electrode V1+ and the first negative electrode V1−) is the output voltage terminal, and the second terminal of the power conversion system 3 (including the second positive electrode V2+ and the second negative electrode V2−) is the input voltage terminal. The switch bridge arm of the start circuit 31 is also connected between the first positive electrode V1+ and the first negative electrode V1−. The first terminal of the serially-connected structure of the third winding T31 and the inductor L31 is connected with the midpoint of the switch bridge arm, i.e., the node between the upper switch S31 and the lower switch S32. The second terminal of the serially-connected structure of the third winding T31 and the inductor L31 is connected with the second positive electrode V2+.

If the first terminal voltage V1 is lower than 4 times the second terminal voltage V2 and the terminal voltages of the two flying capacitors Cb21 and Cb22 are both lower than two times the second terminal voltage V2, the power conversion system 3 is in the first charging state.

Figure 8A:
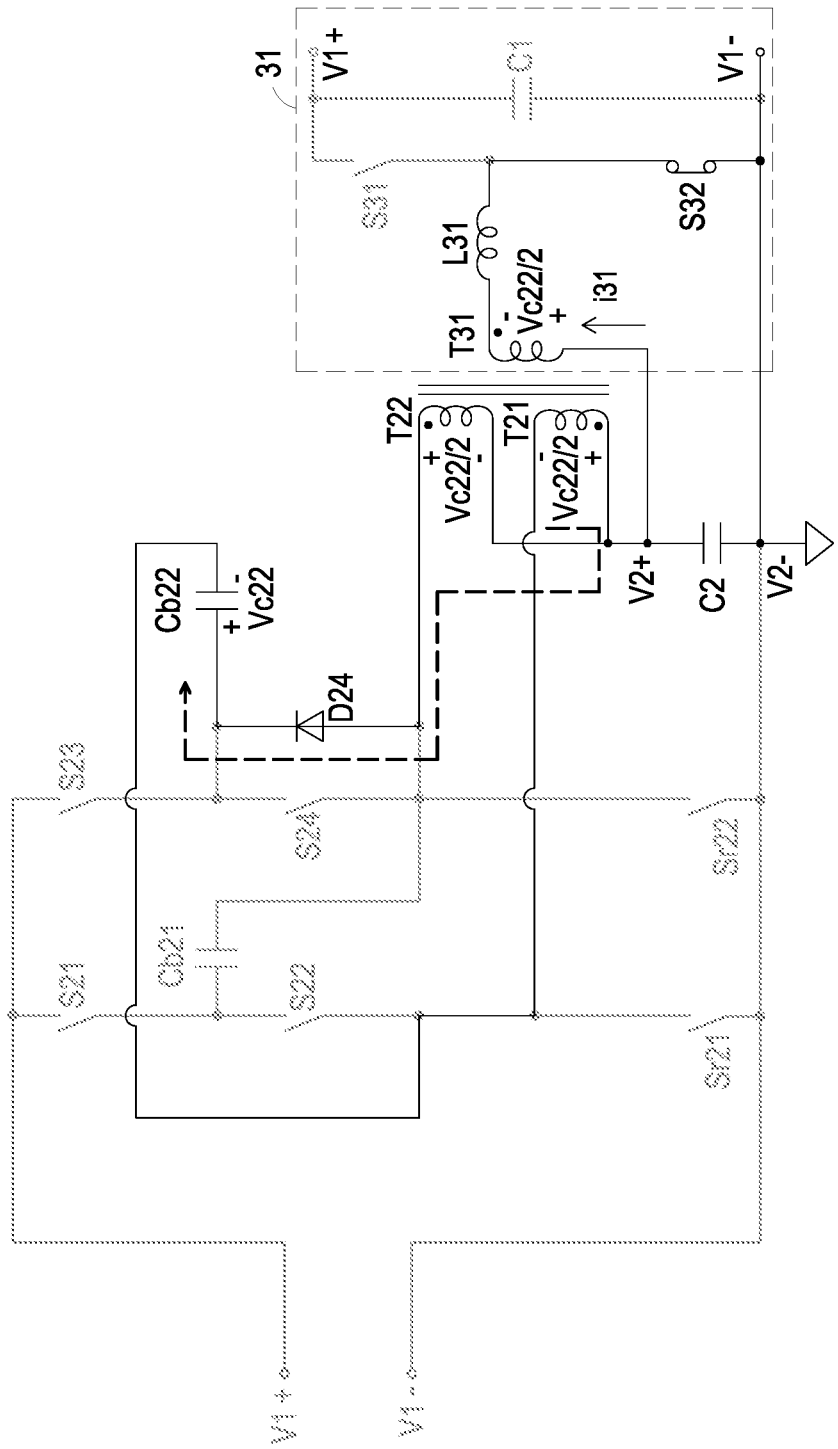
FIGS. 8A, 8B, 8C and 8D are schematic circuit diagrams illustrating the operations of the power conversion system as shown in FIG. 3 in a first charging state, in which the first terminal is the output voltage terminal and the second terminal is the input voltage terminal.
Figure 8B:
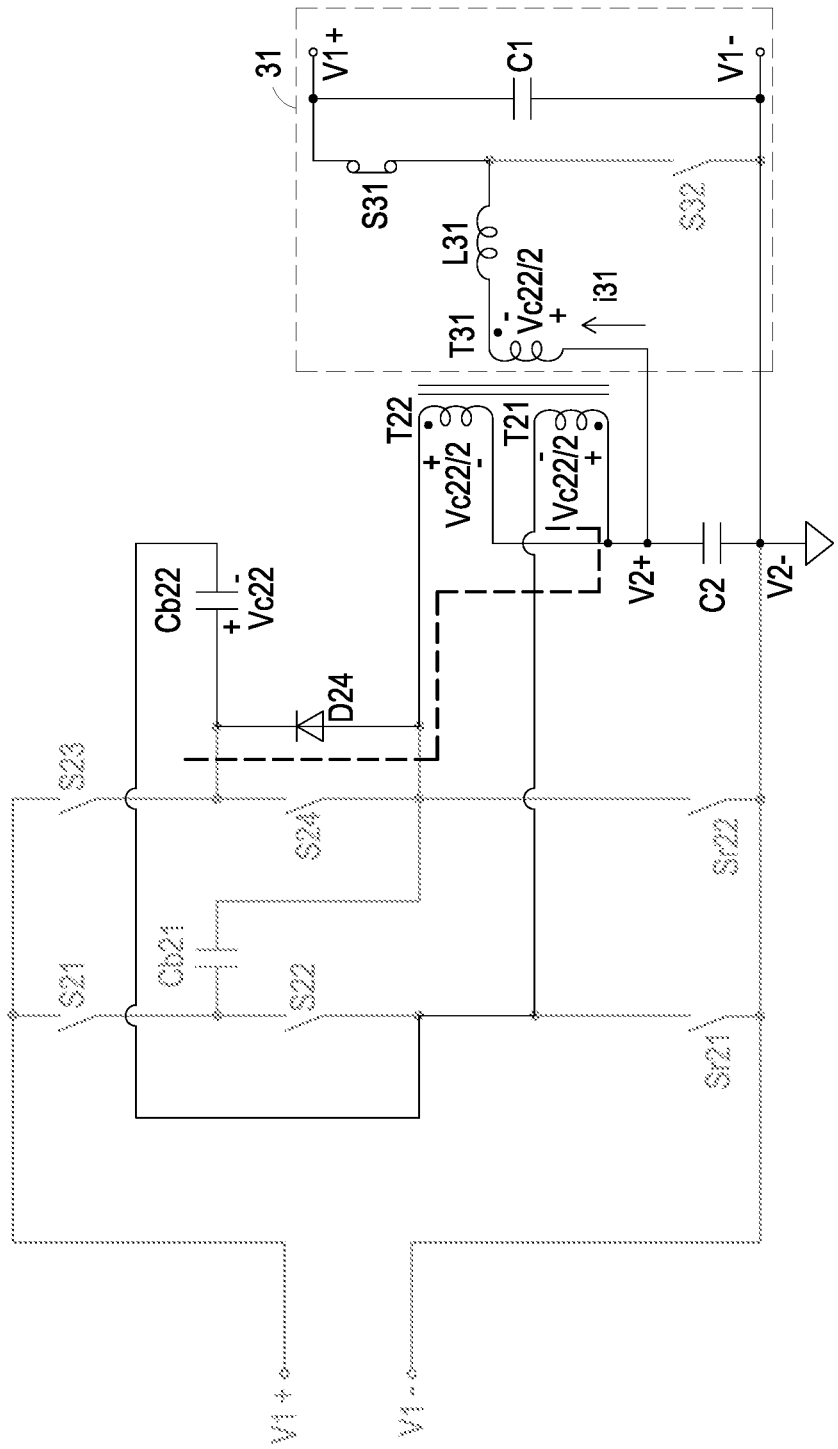
Figure 8C:
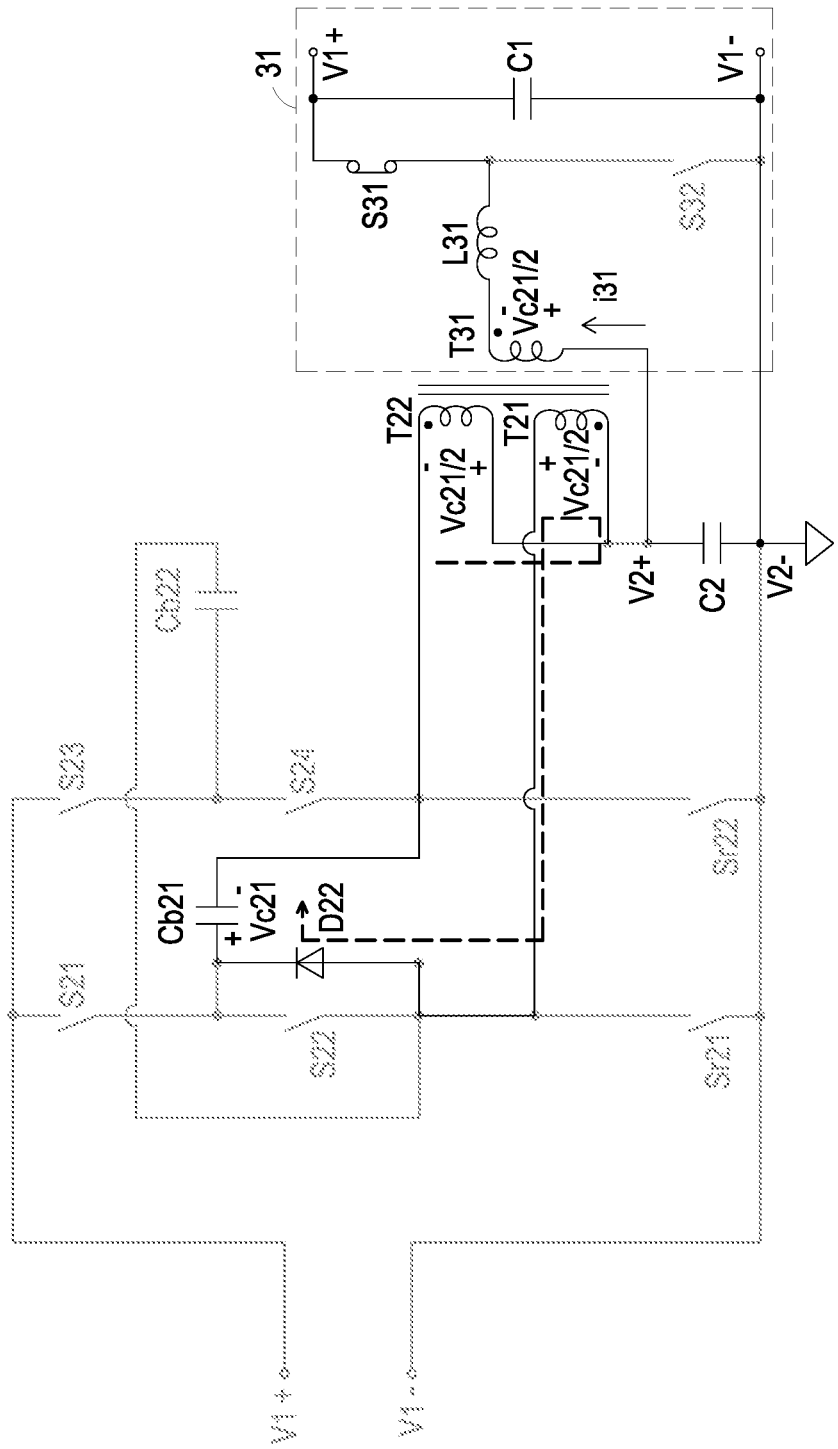
Figure 8D:
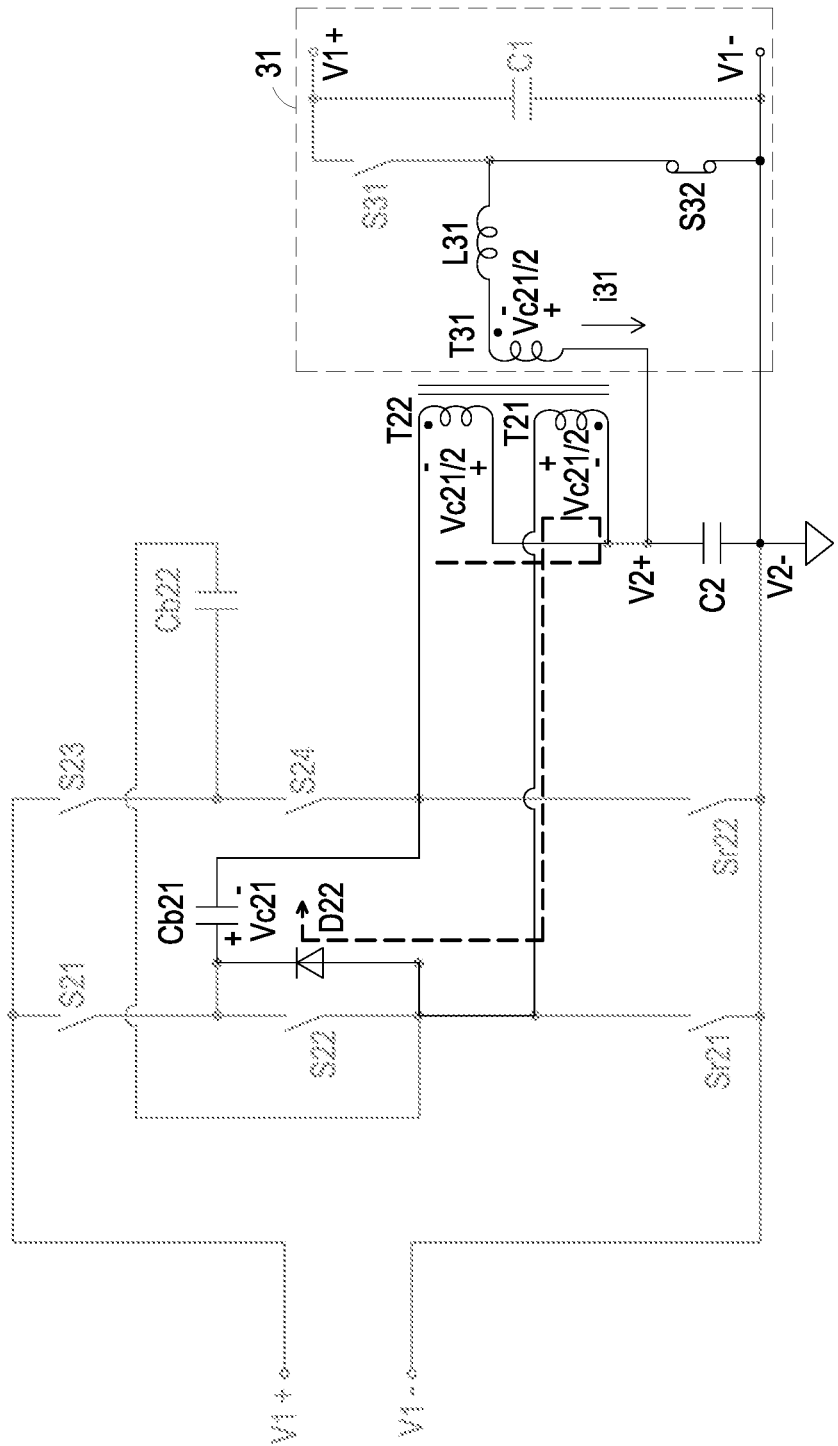
Figure 8E:
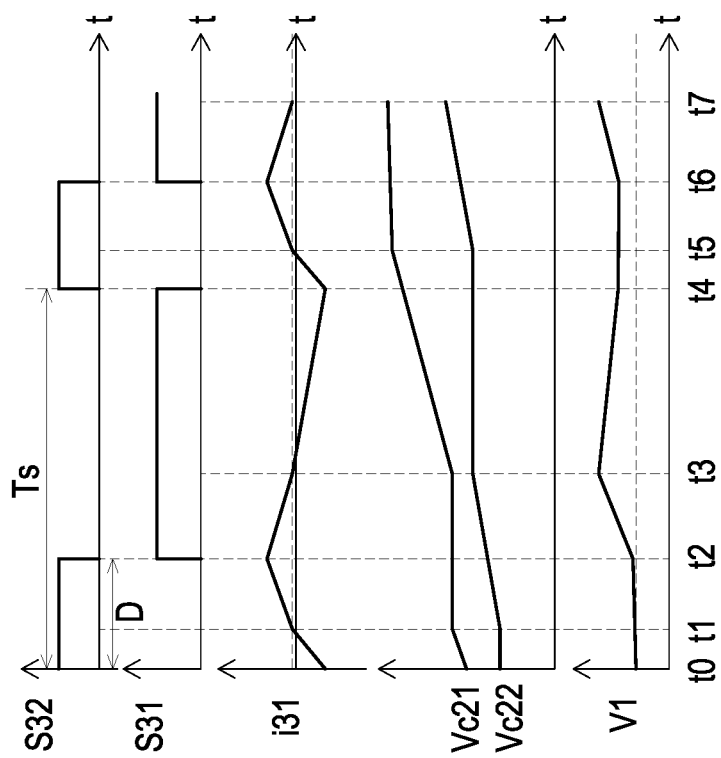
FIG. 8E is a schematic timing waveform diagram illustrating the on/off states of associated switches in the power conversion system of FIG. 3 and associated current signals and voltage signals, in which the first terminal is the output voltage terminal and the second terminal is the input voltage terminal.

Please refer to FIGS. 8A and 8E. In the interval between the time point t1 and the time point t2, the upper switch S31 is turned off, and the lower switch S32 is turned on. At this time, the current i31 in the start circuit 31 flows through the third winding T31, the inductor L31 and the lower switch S32. In addition, the current i31 rises linearly in the positive direction in the interval t1 to t2. Meanwhile, the parasitic diode D24 of the second switch S24 is turned on, and the terminal voltages of the first windings T21 and T22 are clamped to Vc22/2 by the terminal voltage Vc22 of the second flying capacitor Cb22 through the parasitic diode D24 of the second switch S24. Due to the electromagnetic coupling effect between the first windings T21 and T22 and the third winding T31, the terminal voltage of the third winding T31 is clamped to Vc22/2. Due to the electromagnetic coupling effect between the third winding T31 and the first windings T21 and T22, the second flying capacitor Cb22 is pre-charged by the first windings T21 and T22 through the parasitic diode D24 of the second switch S24.

Please refer to FIGS. 8B and 8E. In the interval between the time point t2 and the time point t3, the lower switch S32 is turned off, and the upper switch S31 is turned on. The current i31 in the start circuit 31 flows through the upper switch S31, the inductor L31 and the third winding T31. The current i31 decreases linearly in the positive direction. Moreover, the first capacitor C1 is pre-charged by the current i31 in the interval t2 to t3. Due to the electromagnetic coupling effect between the third winding T31 and the first windings T21 and T22, the second flying capacitor Cb22 is still pre-charged by the first windings T21 and T22 through the parasitic diode D24 of the second switch S24.

Please refer to FIGS. 8C and 8E. In the interval between the time point t3 and the time point t4, the upper switch S31 is turned on, and the lower switch S32 is turned off. The current i31 in the start circuit 31 flows through the upper switch S31, the inductor L31 and the third winding T31. The current i31 rises linearly in the reverse direction in the interval t3 to t4. Meanwhile, the parasitic diode D22 of the fifth switch S22 is turned on, and the terminal voltages of the first windings T21 and T22 are clamped to Vc21/2 by the terminal voltage Vc21 of the first flying capacitor Cb21 through the parasitic diode D22 of the fifth switch S22. Due to the electromagnetic coupling effect between the first windings T21 and T22 and the third winding T31, the terminal voltage of the third winding T31 is Vc21/2. Meanwhile, due to the electromagnetic coupling effect between the third winding T31 and the first windings T21 and T22, the first flying capacitor Cb21 is pre-charged by the first windings T21 and T22 through the parasitic diode D22 of the fifth switch S22.

Please refer to FIGS. 8D and 8E. In the interval between the time point t4 and the time point t5 (corresponding to the interval t0 to t1), the upper switch S31 is turned off, and the lower switch S32 is turned on. At this time, the current i31 in the start circuit 31 flows through the lower switch S32, the inductor L31 and the third winding T31. The current i31 rises linearly in the reverse direction in the interval t4 to t5. Due to the electromagnetic coupling effect between the third winding T31 and the first windings T21 and T22, the first flying capacitor Cb21 is still pre-charged by the first windings T21 and T22 through the parasitic diode D22 of the fifth switch S22. Consequently, the terminal voltages of the first flying capacitor Cb21, the second flying capacitor Cb22 and the first capacitor C1 can be charged by the start circuit 31.

If the terminal voltages of the two flying capacitors Cb21 and Cb22 are charged to be two times the second terminal voltage V2, the power conversion system 3 is in the second charging state. The operations of the power conversion system 3 is in the second charging state can be deduced by referring to FIGS. 5A to 5D and FIGS. 8A to 8E. If the sum of the terminal voltage of the first flying capacitor Cb21 or the second flying capacitor Cb22 and twice the terminal voltage V2 of the second capacitor C2 is equal to the first terminal voltage V1 (i.e., the input terminal voltage of the power conversion system 3), the power conversion system 3 is in the third charging state. The operations of the power conversion system 3 is in the second charging state can be deduced by referring to FIGS. 6A to 6B and FIGS. 8A to 8E.

Of course, the start circuit 31 as shown in FIG. 3 may also be applied to the power conversion circuit as shown in FIGS. 1A and 1B. For succinctness, the operations of the start circuit for the power conversion circuit 1a will be described.

Figure 9A:
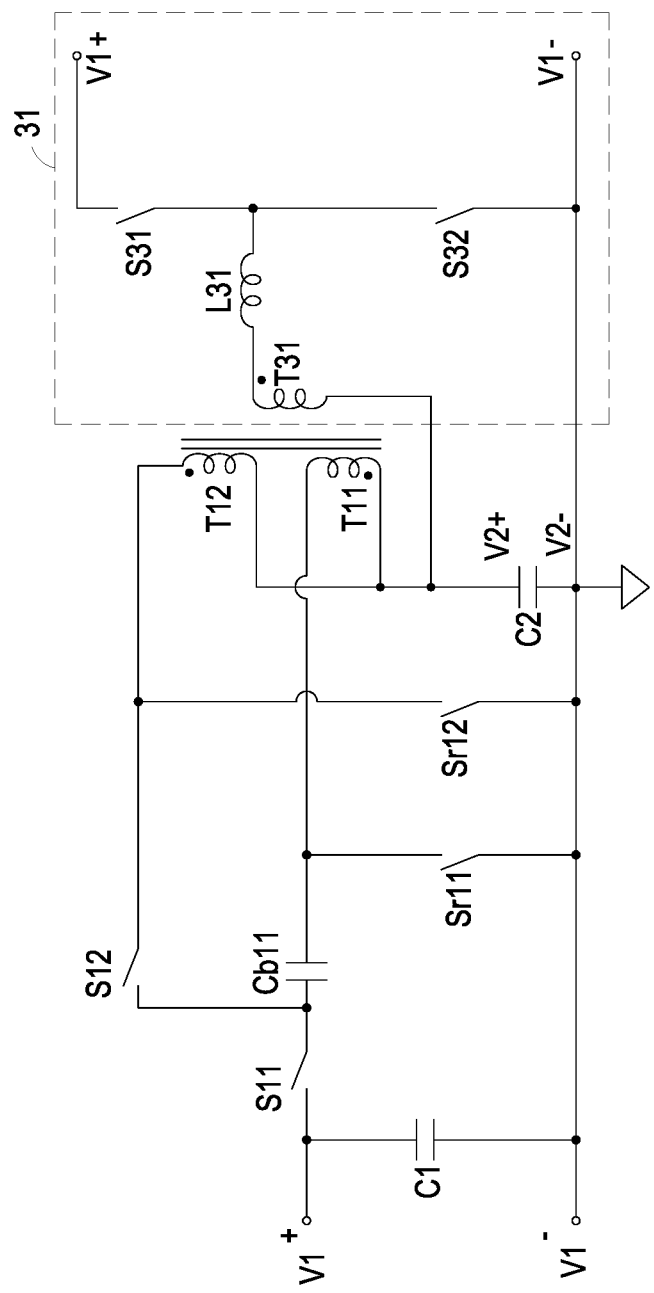
FIG. 9A is a schematic circuit diagram illustrating a power conversion system according to a third embodiment of the present invention.
Figure 9B:
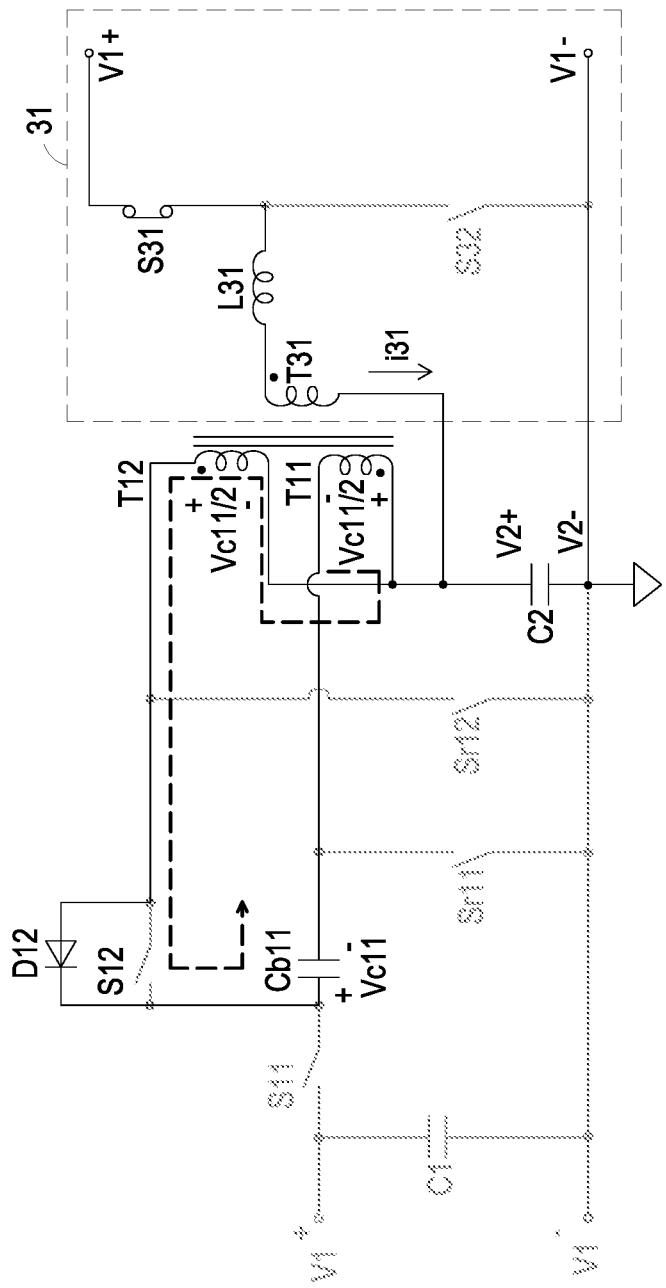
FIGS. 9B and 9C are schematic circuit diagrams illustrating the operations of the power conversion system as shown in FIG. 9A in a first charging state, in which the first terminal is the input voltage terminal and the second terminal is the output voltage terminal.
Figure 9C:
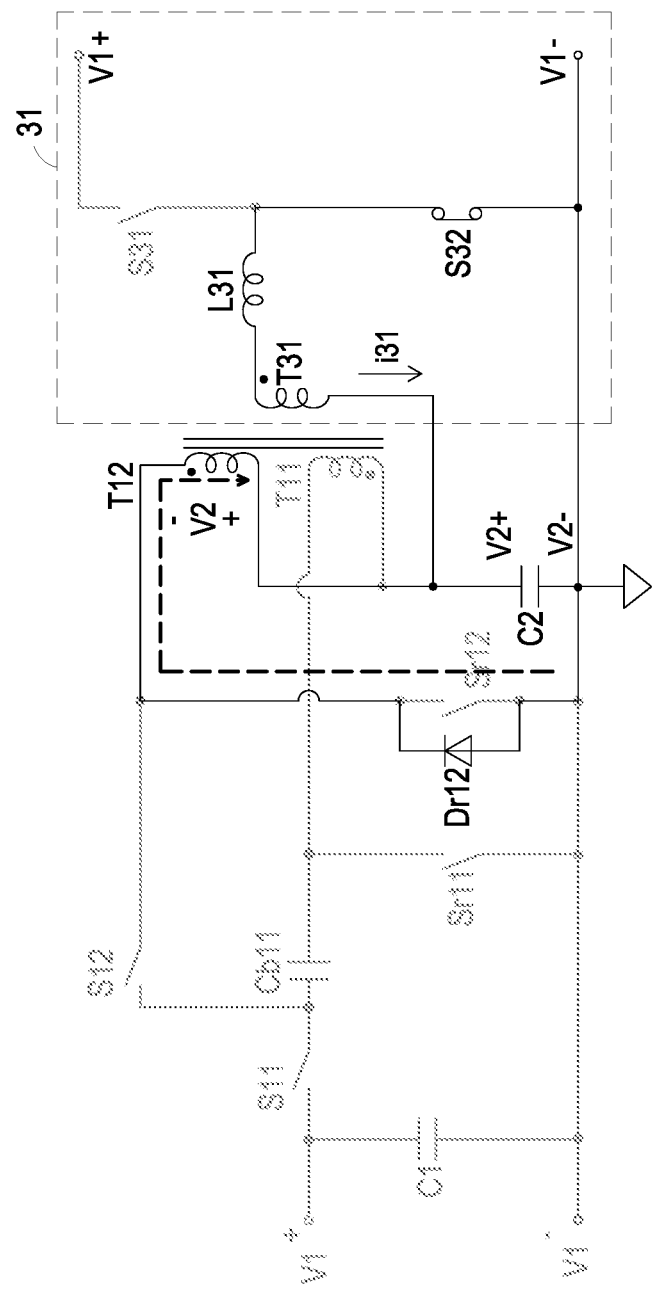

FIG. 9A is a schematic circuit diagram illustrating a power conversion system according to a third embodiment of the present invention. FIGS. 9B and 9C are schematic circuit diagrams illustrating the operations of the power conversion system as shown in FIG. 9A in a first charging state, in which the first terminal is the input voltage terminal and the second terminal is the output voltage terminal. In this embodiment, the power conversion system 5 includes a power conversion circuit 1a and a start circuit 31. The circuitry structure of the power conversion circuit 1a is identical to that of FIG. 1A, and the circuitry structure of the start circuit 31 is identical to that of FIG. 3. The control mechanism of the start circuit 31 is similar to that of FIG. 4E. The turn ratio between the third winding T31, the first winding T11 and the first winding T12 is not restricted. In this embodiment, the turn ratio between the third winding T31, the first winding T11 and the first winding T12 is 1:1:1.

In an embodiment, the inductor L31 is an external inductor. Alternatively, in another embodiment, the inductor L31 is a leakage inductor that is electromagnetically coupled with the two first windings T11, T12 and the third winding T31.

In an embodiment, the first terminal of the power conversion system 5 (including the first positive electrode V1+ and the first negative electrode V1−) is the input voltage terminal, and the second terminal of the power conversion system 5 (including the second positive electrode V2+ and the second negative electrode V2−) is the output voltage terminal.

If the second terminal voltage V2 is lower than a quarter of the first terminal voltage V1 and the terminal voltage Vc11 of the flying capacitor Cb11 is lower than half or the first terminal voltage V1, the power conversion system 5 is in the first charging state. Please refer to FIGS. 9A and 4E. In the interval between the time point t1 and the time point t2, the upper switch S31 is turned on, and the lower switch S32 is turned off. At this time, the current i31 in the start circuit 31 flows through the upper switch S31 and the inductor L31 and the third winding T31 to pre-charge the second capacitor C2. In addition, the current i31 rises linearly in the positive direction in the interval t1 to t2. Meanwhile, the terminal voltages of the first windings T11 and T12 are clamped to Vc11/2 by the terminal voltage Vc11 of the flying capacitor Cb11 through the parasitic diode D12 of the second switch S12. Due to the electromagnetic coupling effect between the first windings T11 and T12 and the third winding T31, the terminal voltage of the third winding T31 is Vc11/2. Moreover, due to the electromagnetic coupling effect between the third winding T31 and the first windings T11 and T12, the flying capacitor Cb11 is pre-charged by the first windings T11 and T12 through the parasitic diode D12 of the second switch S12.

Please refer to FIG. 4E again. In the interval between the time point t2 and the time point t3, the upper switch S31 is turned off, and the lower switch S32 is turned on. The current i31 in the start circuit 31 flows through the lower switch S32, the inductor L31 and the third winding T31. The current i31 decreases linearly in the positive direction to continuously pre-charge the second capacitor C2 and the flying capacitor Cb11. The operations of the power conversion system in the interval t2 to t3 are similar to those of FIG. 4B, and are not redundantly described herein.

Please refer to FIGS. 9C and 4E. In the interval between the time point t3 and the time point t4, the lower switch S32 is turned on, and the upper switch S31 is turned off. At this time, the current i31 in the start circuit 31 flows through the third winding T31, the inductor L31 and the lower switch S32. The current i31 rises linearly in the reverse direction in the interval t3 to t4. Meanwhile, the parasitic diode Dr12 of the fourth switch Sr12 is turned on. Due to the electromagnetic coupling effect between the third winding T31 and the first winding T12, the second capacitor C2 is pre-charged through the parasitic diode Dr12 of the fourth switch Sr12.

Please refer to FIG. 4E again. In the interval between the time point t4 and the time point t5 (corresponding to the interval t0 to t1), the lower switch S32 is turned off, and the upper switch S31 is turned on. At this time, the current i31 in the start circuit 31 flows through the upper switch S31, the inductor L31 and the third winding T31. The current i31 rises linearly in the reverse direction in the interval t4 to t5. Due to the electromagnetic coupling effect between the first windings T11 and T12 and the third winding T31, the second capacitor C2 is still pre-charged.

In the power conversion circuit of the power conversion system as shown in FIG. 9A, the first terminal is the input voltage terminal, and the second terminal is the output voltage terminal. In addition, the power conversion system is in the first charging state. The operations of the power conversion system in the second charging state and the third charging state may be deduced from the descriptions of the first embodiment.

During the process of starting the power conversion circuit 1a, the first switch S11 of the first switching unit is in the off state. The alternating voltage on the third winding T31 of the start circuit 31 and the parasitic diodes of the corresponding switches are used. Consequently, the terminal voltage of the flying capacitor Cb11 and the terminal voltage of the second capacitor C2 are charged up to a preset voltage. For example, after the terminal voltage of the flying capacitor Cb11 and the terminal voltage of the second capacitor C2 are charged to a steady state of the power conversion circuit 1a, the start process of the power conversion system 5 is completed. At the same time, the on/off state of the at least one switch in the first switch unit and the second switch unit of the power conversion circuit is switched. Consequently, the electronic components in the power conversion system 5 (e.g., switches) will not be suffered from the impact of the large current, and the possibility of causing the damage of the electronic components is largely reduced. Moreover, the cost-effective electronic components can be employed.

Figure 10A:
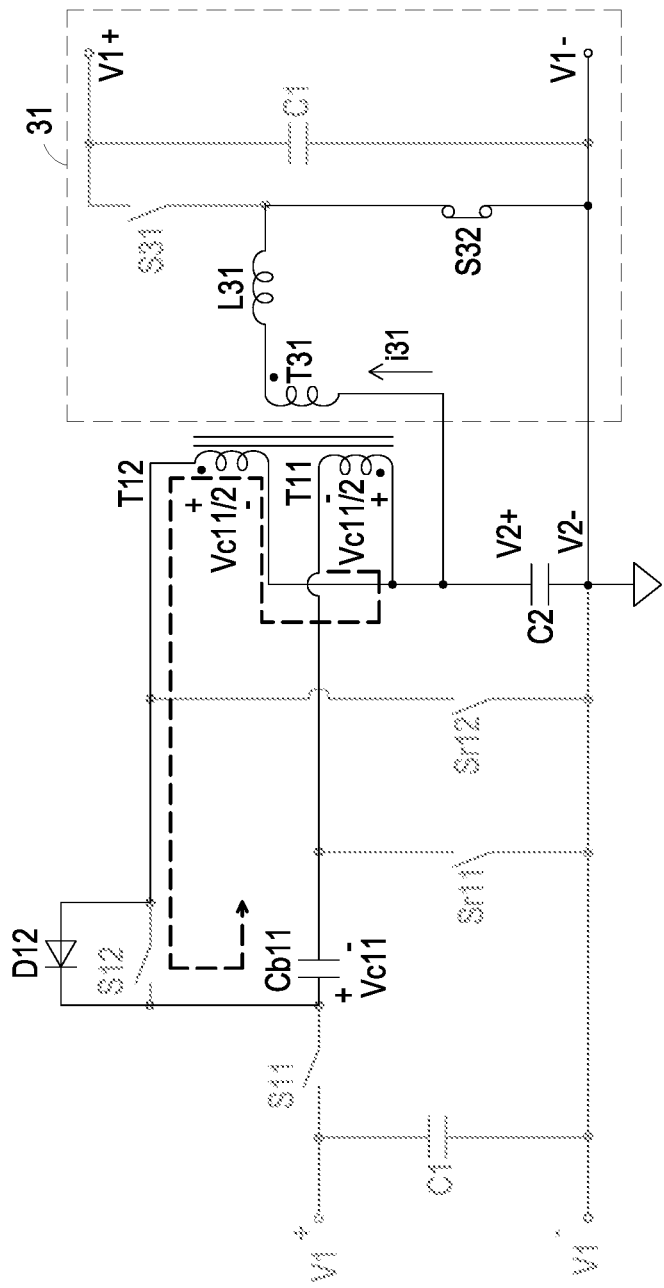
FIGS. 10A and 10B are schematic circuit diagrams illustrating the operations of the power conversion system as shown in FIG. 9A in a first charging state, in which the first terminal is the output voltage terminal and the second terminal is the input voltage terminal.
Figure 10B:
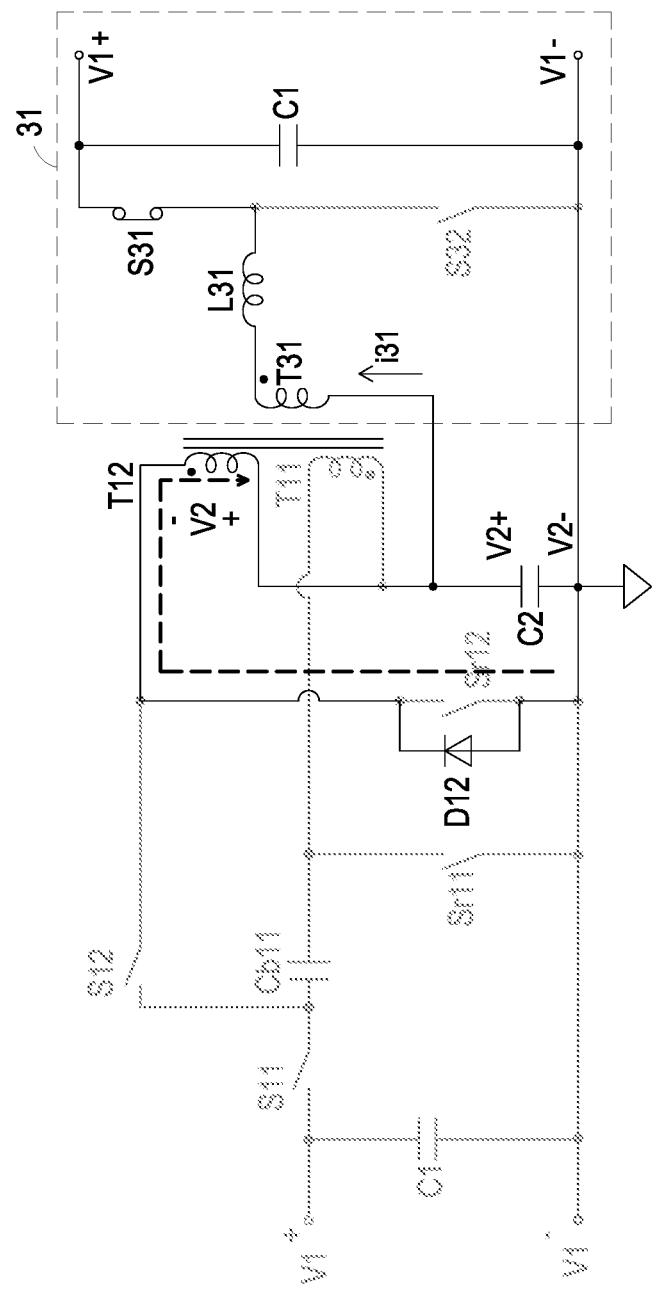

The power conversion circuit of the present invention has the function of converting the electric power in the bidirectional manner. In the following embodiment, the first terminal of the power conversion circuit is the output terminal, and the second terminal of the power conversion circuit is the input terminal. FIGS. 10A and 10B are schematic circuit diagrams illustrating the operations of the power conversion system as shown in FIG. 9A in a first charging state, in which the first terminal is the output voltage terminal and the second terminal is the input voltage terminal. In this embodiment, the first terminal of the power conversion system (including the first positive electrode V1+ and the first negative electrode V1−) is the output voltage terminal, and the second terminal of the power conversion system (including the second positive electrode V2+ and the second negative electrode V2−) is the input voltage terminal. The switch bridge arm of the start circuit 31 is also connected between the first positive electrode V1+ and the first negative electrode V1−. The first terminal of the serially-connected structure of the third winding T31 and the inductor L31 is connected with the midpoint of the switch bridge arm, i.e., the node between the upper switch S31 and the lower switch S32. The second terminal of the serially-connected structure of the third winding T31 and the inductor L31 is connected with the second positive electrode V2+.

If the first terminal voltage V1 is lower than 4 times the second terminal voltage V2 and the terminal voltage of the flying capacitor Cb11 is lower than two times the second terminal voltage V2, the power conversion system 5 is in the first charging state Please refer to FIGS. 10A and 8E. In the interval between the time point t1 and the time point t2, the upper switch S31 is turned off, and the lower switch S32 is turned on. At this time, the current i31 in the start circuit 31 flows through the third winding T31, the inductor L31 and the lower switch S32. In addition, the current i31 rises linearly in the positive direction in the interval t1 to t2. Meanwhile, the parasitic diode D12 of the second switch S12 is turned on, and the terminal voltages of the first windings T11 and T12 are clamped to Vc11/2 by the terminal voltage Vc11 of the flying capacitor Cb11 through the parasitic diode D12 of the second switch S12. Due to the electromagnetic coupling effect between the third winding T31 and the first windings T11 and T12, the flying capacitor Cb11 is pre-charged by the first windings T11 and T12 through the parasitic diode D12.

Please refer to FIG. 8E again. In the interval between the time point t2 and the time point t3, the upper switch S31 is turned on, and the lower switch S32 is turned off. The current i31 in the start circuit 31 flows through the upper switch S31, the inductor L31 and the third winding T31. The current i31 decreases linearly in the positive direction. Moreover, the first capacitor C1 is pre-charged by the current i31 in the interval t2 to t3. The operations of the power conversion system 5 in the interval t2 to t3 are similar to those of FIG. 8B, and are not redundantly described herein.

Please refer to FIGS. 10B and 8E. In the interval between the time point t3 and the time point t4, the upper switch S31 is turned on, and the lower switch S32 is turned off. The current i31 in the start circuit 31 flows through the upper switch S31, the inductor L31 and the third winding T31. The current i31 rises linearly in the reverse direction in the interval t3 to t4. Meanwhile, the parasitic diode Dr12 of the fourth switch Sr12 is turned on. The terminal voltage of the first winding T12 is clamped to V2 by the terminal voltage V2 of the second capacitor C2 through the parasitic diode Dr12 of the fourth switch Sr12. Meanwhile, due to the electromagnetic coupling effect between the third winding T31 and the first windings T11 and T12, the flying capacitor Cb11 is pre-charged.

Please refer to FIG. 8E again. In the interval between the time point t4 and the time point t5, the lower switch S32 is turned on, and the upper switch S31 is turned off. At this time, the current i31 in the start circuit 31 flows through the lower switch S32, the inductor L31 and the third winding T31. The current i31 rises linearly in the reverse direction in the interval t4 to t5. Due to the electromagnetic coupling effect between the first windings T21 and T22 and the third winding T31, the flying capacitor Cb11 is still pre-charged. The operations of the power conversion system 5 in the interval t4 to t5 are similar to those of FIG. 8D, and are not redundantly described herein.

In the power conversion circuit of the above power conversion system, the second terminal is the input voltage terminal, and the first terminal is the output voltage terminal. In addition, the power conversion system is in the first charging state. The operations of the power conversion system in the second charging state and the third charging state may be deduced from the descriptions of the first embodiment.

During the process of starting the power conversion circuit, the first switch S11 of the first switching unit is in the off state. The alternating voltage on the third winding T31 of the start circuit 31 and the parasitic diodes of the corresponding switches are used. Consequently, the terminal voltage of the flying capacitor Cb11 and the terminal voltage of the first capacitor C1 are charged up to a preset voltage. For example, after the terminal voltage of the flying capacitor Cb11 and the terminal voltage of the first capacitor C1 are charged to a steady state of the power conversion circuit, the start process of the power conversion system 5 is completed. At the same time, the on/off state of the at least one switch in the first switch unit and the second switch unit of the power conversion circuit is switched. Consequently, the electronic components in the power conversion system 5 (e.g., switches) will not be suffered from the impact of the large current, and the possibility of causing the damage of the electronic components is largely reduced. Moreover, the cost-effective electronic components can be employed.

In case that the power conversion circuit as shown in FIGS. 1A, 1B, 2A, 2B, 2C and 2D has the function of converting the electric power in the unidirectional manner, one switch of the corresponding start circuit may be replaced by a diode.

Figure 11A:
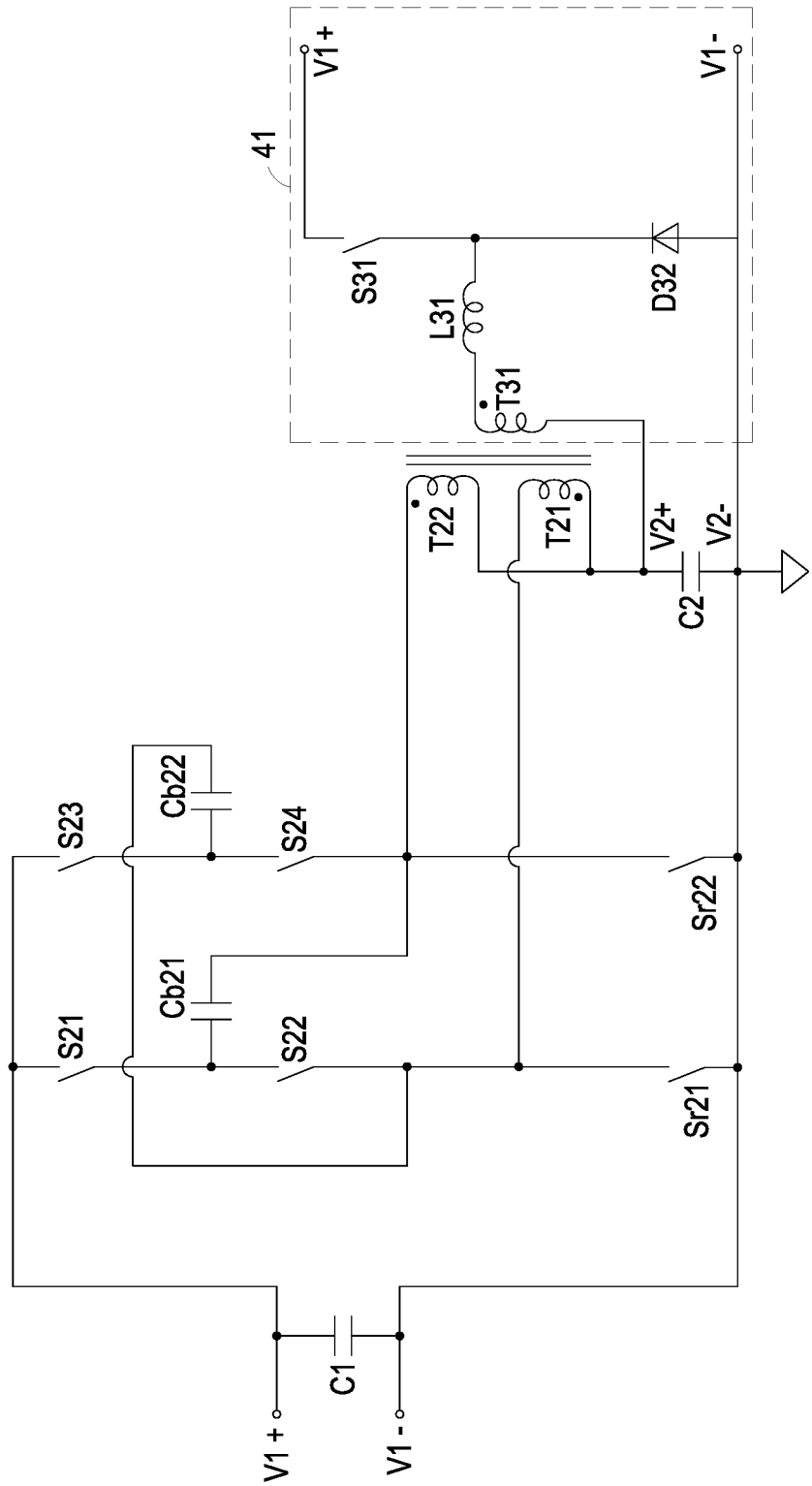
FIG. 11A is a schematic circuit diagram illustrating a power conversion system according to a fourth embodiment of the present invention.

FIG. 11A is a schematic circuit diagram illustrating a power conversion system according to a fourth embodiment of the present invention. In this embodiment, the power conversion system 6 includes a power conversion circuit 2a and a start circuit 41. The circuitry structure of the power conversion circuit 2a is identical to that of FIG. 2A. In the power conversion circuit 2a, the first terminal is the input terminal, and the second terminal is the output terminal. Moreover, the lower switch S32 in the switch bridge arm of the start circuit 31 as shown in FIG. 3 may be replaced by a diode D32, and the upper switch S31 is still the controllable switch. In the start circuit 41 of this embodiment, the cathode of the diode D32 is electrically connected with the upper switch S31, and the anode of the diode D32 is electrically connected with the first negative electrode V1−.

Figure 11B:
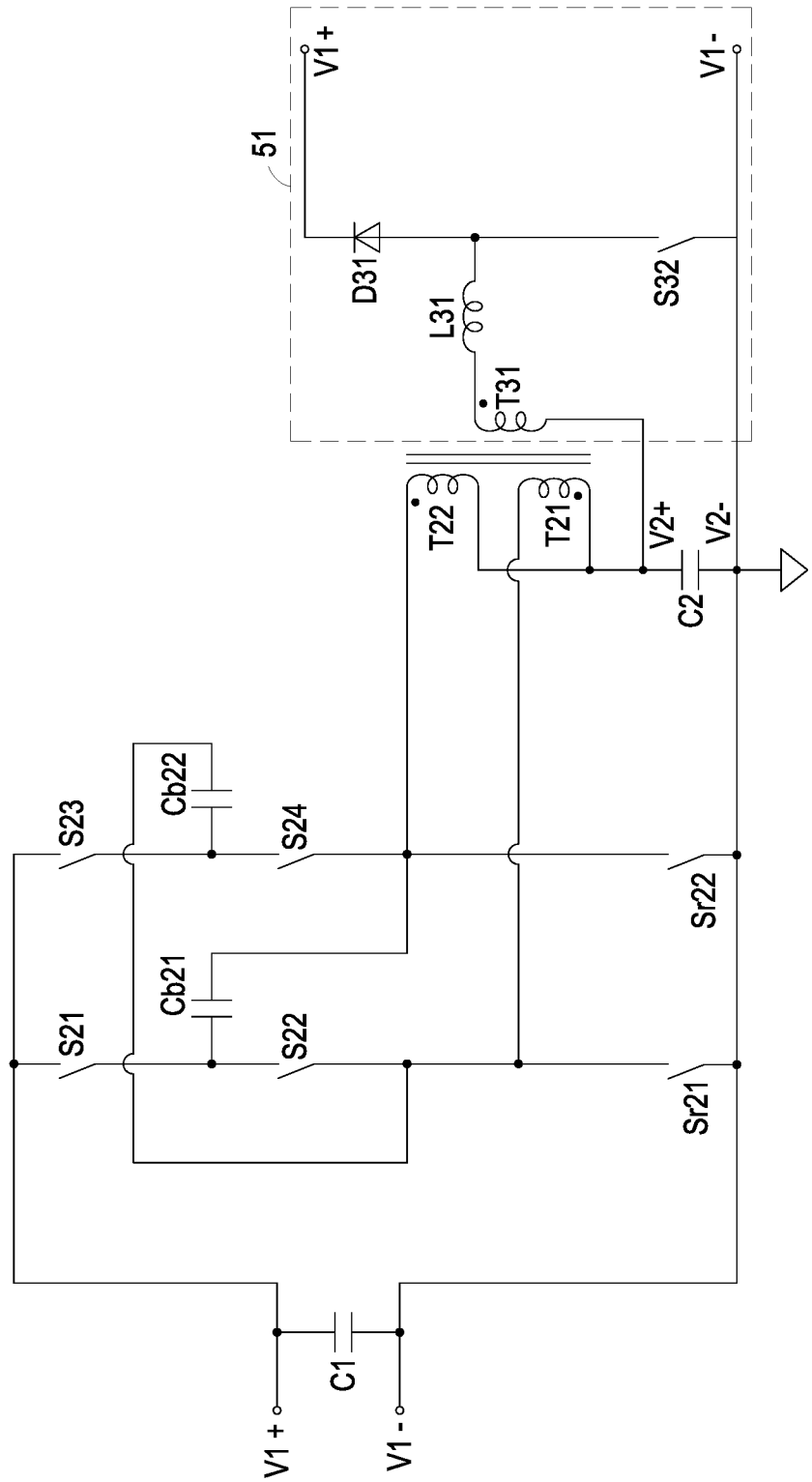
FIG. 11B is a schematic circuit diagram illustrating a power conversion system according to a fifth embodiment of the present invention.

FIG. 11B is a schematic circuit diagram illustrating a power conversion system according to a fifth embodiment of the present invention. In this embodiment, the power conversion system 7 includes a power conversion circuit 2a and a start circuit 51. The circuitry structure of the power conversion circuit 2a is identical to that of FIG. 2A. In the power conversion circuit 2a, the second terminal is the input terminal, and the first terminal is the output terminal. Moreover, the upper switch S31 in the switch bridge arm of the start circuit 31 as shown in FIG. 3 may be replaced by a diode D31, and the lower switch S32 is still the controllable switch. In the start circuit 51 of this embodiment, the anode of the diode D31 is electrically connected with the lower switch S32, and the cathode of the diode D31 is electrically connected with the first positive electrode V1+.

In the above embodiment, each of the switches is a metal-oxide-semiconductor transistor (MOS), a silicon carbide (SiC) switch or a gallium nitride (GaN) switch.

In some embodiments, the power conversion system includes plural power conversion circuits, and the plural power conversion circuits are connected with each other in parallel. The power conversion circuit has the circuitry structure as shown in FIGS. 1A, 1B, 2A, 2B, 2C and 2D. In the following embodiment, the power conversion system with two parallel-connected power conversion circuits 2a will be described.

Figure 12:
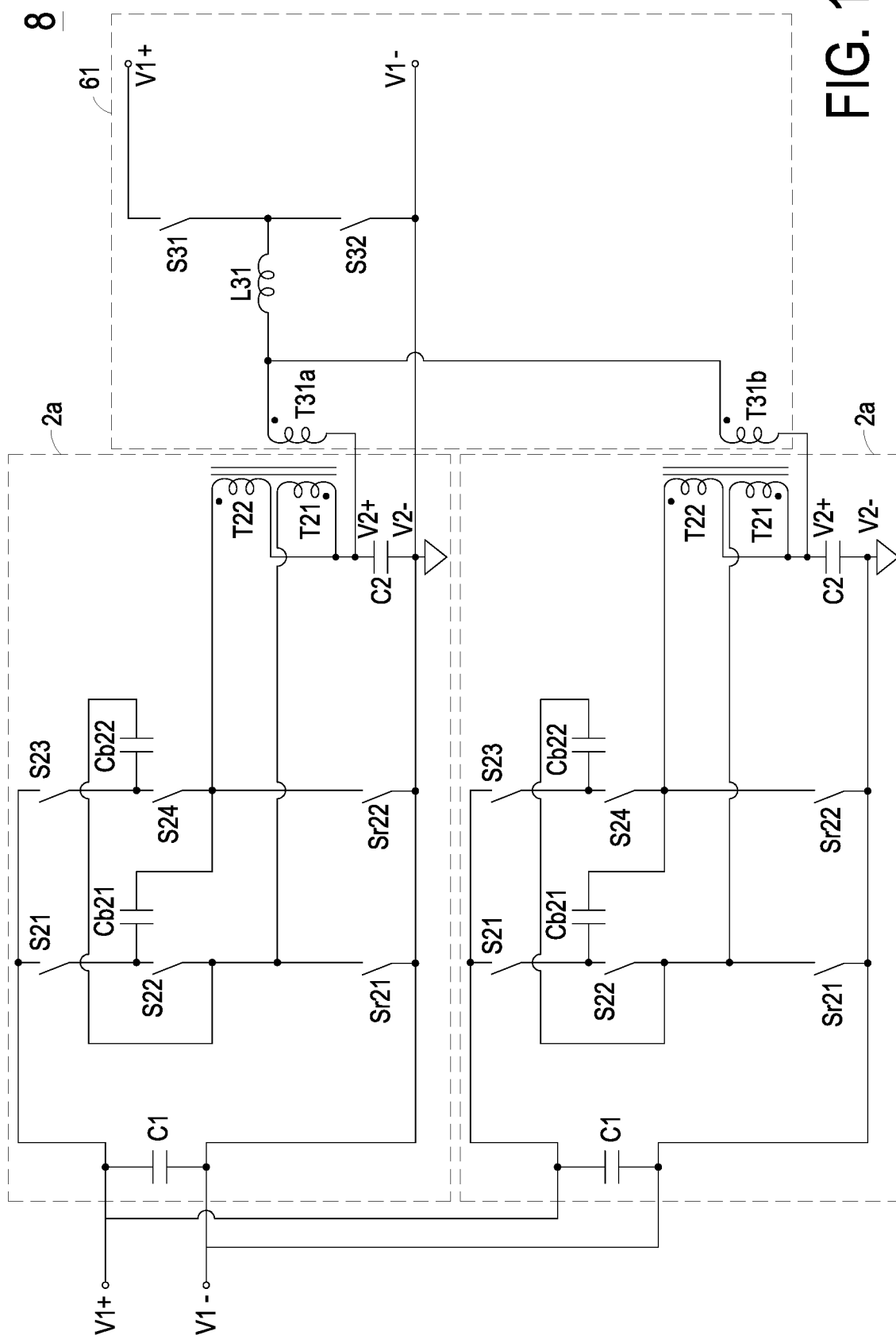
FIG. 12 is a schematic circuit diagram illustrating a power conversion system according to a sixth embodiment of the present invention.

FIG. 12 is a schematic circuit diagram illustrating a power conversion system according to a sixth embodiment of the present invention. In this embodiment, the power conversion system 8 includes two power conversion circuits 2a. The first terminals of the two power conversion circuits 2a are electrically connected with each other. The second terminals of the two power conversion circuits 2a are connected with each other. In an embodiment, the power conversion circuit 2a includes a first capacitor C1 and a second capacitor C2. In another embodiment, a single first capacitor C1 is shared by the first terminals of the two power conversion circuits 2a, and a single second capacitor C2 is shared by the second terminals of the two power conversion circuits 2a.

The power conversion system 8 further includes a start circuit 61. The starting circuit 61 includes two third windings T31a, T31b, an inductor L31 and a switch bridge arm. The switch bridge arm includes an upper switch S31 and a lower switch S32, which are electrically connected with each other. Moreover, the control signals for controlling the upper switch S31 and the lower switch S32 are the identical to those in the above embodiments. Moreover, the switch bridge arm is formed as an input terminal of the start circuit 61. The input terminal of the start circuit 61 is electrically connected with the first positive electrode V1+ and the first negative electrode V1−. The third windings T31*a* and T31*b* are electrically connected with each other in parallel. The third windings T31*a* and T31*b* are electromagnetically coupled with the first windings T21, and T22 of the two power conversion circuits 2*a*. The parallel-connected structure of the third windings T31*a* and T31*b* is electrically connected with the inductor L31 to define a serially-connected structure. A first terminal of the serially-connected structure is connected with the midpoint of the switch bridge arm, i.e., the node between the upper switch S31 and the lower switch S32. A second terminal of the serially-connected structure is connected with the second positive electrode V2+. Due to the electromagnetic coupling effect between the third windings and the first windings, the output capacitor, the first flying capacitor and the second flying capacitor are pre-charged to the preset voltage. When the preset voltage is achieved, the start process of the power conversion system is completed. At the same time, the on/off state of the at least one switch in the first switch unit and the second switch unit of the power conversion circuit is switched.

From the above descriptions, the present invention provides a power conversion system. The power conversion system includes a power conversion circuit and a start circuit. When the terminal voltages of the flying capacitor and the output capacitor are charged to the preset voltage, the start process of the power conversion circuit is completed. Consequently, the electronic components in the power conversion system (e.g., switches) will not be suffered from the impact of the large current, and the possibility of causing the damage of the electronic components is largely reduced. Moreover, the cost-effective electronic components can be employed.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power conversion system, comprising:
   a power conversion circuit comprising a first terminal, a second terminal, an output capacitor, at least one switching unit, at least one flying capacitor and a magnetic element, wherein each switching unit comprises two switch groups, the at least one flying capacitor is connected between the first terminal and the second terminal of the power conversion circuit, and the magnetic element comprises two first windings, wherein the two first windings are electromagnetically coupled with each other, a first one of the two first windings is electrically connected between a first one of the two switch groups and the second terminal of the power conversion circuit, a second one of the two first windings is electrically connected between a second one of the two switch groups and the second terminal of the power conversion circuit, opposite-polarity terminals of the two first windings are electrically connected with the second terminal of the power conversion circuit, and the output capacitor is electrically connected with the first terminal or the second terminal; and
   a start circuit configured to control the power conversion circuit to pre-charge and comprising a third winding, an inductor and at least one switch element, wherein the third winding is electromagnetically coupled with the two first windings, and the inductor and the third winding are connected in series to form a serially-connected structure, wherein a first terminal of the serially-connected structure is electrically connected with the first terminal of the power conversion circuit, a second terminal of the serially-connected structure is electrically connected with the second terminal of the power conversion circuit, and a first terminal of the at least one switch element is electrically connected with the first terminal of the serially-connected structure,
   wherein during a start process of the power conversion circuit, an on/off state of the at least one switch element is switched, so that the at least one flying capacitor and the output capacitor are pre-charged.

2. The power conversion system according to claim 1, wherein the start circuit further comprises a switch bridge arm, and the at least one switch element is included in the switch bridge arm, wherein the first terminal of the serially-connected structure is electrically connected with the switch bridge arm, and an input terminal of the switch bridge arm is electrically connected with the first terminal of the power conversion circuit.

3. The power conversion system according to claim 2, wherein two input points of the input terminal of the switch bridge arm are respectively connected with a first positive electrode and a first negative electrode of the first terminal of the power conversion circuit, and the at least one switch element includes an upper switch and a lower switch, wherein the first terminal of the serially-connected structure is electrically connected with a node between the upper switch and the lower switch, wherein by controlling an on/off state of the upper switch and/or the lower switch, a first terminal and a second terminal of the serially-connected structure generate an alternating voltage.

4. The power conversion system according to claim 3, wherein the upper switch and the lower switch are controllable switches, wherein a duty cycle of a first control signal for controlling the upper switch and a duty cycle of a second control signal for controlling the lower switch are complementary.

5. The power conversion system according to claim 4, wherein the duty cycle of the first control signal and the duty cycle of the second control signal are fixed.

6. The power conversion system according to claim 4, wherein the duty cycle of the first control signal and the duty cycle of the second control signal are gradually increased from zero to 50%, or the duty cycle of the first control signal is gradually increased from zero to 100%.

7. The power conversion system according to claim 3, wherein the upper switch is a controllable switch, and the lower switch is a diode, wherein the first terminal of the serially-connected structure is electrically connected with a node between a first terminal of the controllable switch and a cathode of the diode, an anode of the diode is electrically connected with a first negative electrode of the first terminal of the power conversion circuit, and a second terminal of the controllable switch is electrically connected with a first positive electrode of the first terminal of the power conversion circuit, wherein by controlling an on/off state of the controllable switch, the alternating voltage is generated.

8. The power conversion system according to claim 3, wherein the lower switch is a controllable switch, and the upper switch is a diode, wherein the first terminal of the serially-connected structure is electrically connected with a node between a first terminal of the controllable switch and an anode of the diode, a cathode of the diode is electrically connected with a first positive electrode of the first terminal of the power conversion circuit, and a second terminal of the controllable switch is electrically connected with a first negative electrode of the first terminal of the power conversion circuit, wherein by controlling an on/off state of the controllable switch, the alternating voltage is generated.

9. The power conversion system according to claim 1, wherein the first terminal of the power conversion circuit comprises a first positive electrode and a first negative electrode, the second terminal of the power conversion circuit comprises a second positive electrode and a second negative electrode, the output capacitor is electrically connected with the first terminal or the second terminal of the power conversion circuit, and the at least one switching unit comprises a first switching unit and a second switching unit, wherein the first switching unit comprises a first switch group and a second switch group, and the second switching unit comprises a third switch group and a fourth switch group, wherein the third switch group is electrically connected with the first switch group, the fourth switch group is electrically connected with the second switch group, and a first terminal of the third switch group and a first terminal of the fourth switch group are electrically connected with the first negative electrode, wherein the first one of the two first windings is electrically connected between the third switch group and the second terminal of the power conversion circuit, and the second one of the two first windings is electrically connected between the fourth switch group and the second terminal of the power conversion circuit.

10. The power conversion system according to claim 9, wherein the magnetic element further comprises at least one second winding, and the at least one second winding and the two first windings are electromagnetically coupled with each other, wherein the second winding and the flying capacitor are electrically connected between a first terminal of the first switch group and a first terminal of the corresponding first winding, and a terminal of the second winding and the first terminal of the corresponding first winding are opposite-polarity terminals and electrically connected with each other, wherein a turn ratio between the second winding, the first one of the two first windings and the second one of the two first windings is N:1:1, wherein N is a positive value.

11. The power conversion system according to claim 1, wherein the inductor is an external inductor, or the inductor is a leakage inductor that is electromagnetically coupled with the two first windings and the third winding.

12. The power conversion system according to claim 1, wherein when the output capacitor is charged to a first preset voltage, and the at least one flying capacitor is pre-charged to a second preset voltage, the start process of the power conversion system is completed, and an on/off state of the at least one switch in the power conversion circuit is switched.

13. The power conversion system according to claim 12, wherein the first preset voltage is greater than or equal to 70% of a steady state voltage of the output capacitor, and the second preset voltage is greater than or equal to 70% of a steady state voltage of the corresponding flying capacitor.

14. A power conversion system, comprising:
at least two power conversion circuits, wherein each power conversion circuit comprises a first terminal, a second terminal, an output capacitor, at least one switching unit, at least one flying capacitor and a magnetic element, wherein each switching unit comprises two switch groups, the at least one flying capacitor is connected between the first terminal and the second terminal of the power conversion circuit, and the magnetic element comprises two first windings, wherein the two first windings are electromagnetically coupled with each other, a first one of the two first windings is electrically connected between a first one of the two switch groups and the second terminal of the power conversion circuit, a second one of the two first windings is electrically connected between a second one of the two switch groups and the second terminal of the power conversion circuit, and opposite-polarity terminals of the two first windings are electrically connected with the second terminal of the power conversion circuit, wherein the first terminals of the at least two power conversion circuits are electrically connected with each other, and the second terminals of the at least two power conversion circuits are electrically connected with each other; and
a start circuit configured to control the at least two power conversion circuits to per-charge and comprising at least two third windings, an inductor and at least one switch element, wherein the at least two third windings are connected with other in parallel, each third winding is electromagnetically coupled with the two first windings of the corresponding power conversion circuit, and the inductor and the parallel-connected third windings are connected in series to form a serially-connected structure, wherein a first terminal of the serially-connected structure is electrically connected with the first terminal of the power conversion circuit, a second terminal of the serially-connected structure is electrically connected with the second terminal of the power conversion circuit, and a first terminal of the at least one switch element is electrically connected with the first terminal of the serially-connected structure.

15. The power conversion system according to claim 14, wherein the start circuit further comprises a switch bridge arm, and the at least one switch element is included in the switch bridge arm, wherein the first terminal of the serially-connected structure is electrically connected with the switch bridge arm, and an input terminal of the switch bridge arm is electrically connected with the first terminal of the power conversion circuit, wherein the at least one switch element includes an upper switch and a lower switch, wherein the first terminal of the serially-connected structure is electrically connected with a node between the upper switch and the lower switch, wherein by controlling an on/off state of the upper switch and/or the lower switch, a first terminal and a second terminal of the serially-connected structure generate an alternating voltage.

16. The power conversion system according to claim 15, wherein the upper switch and the lower switch are controllable switches, wherein a duty cycle of a first control signal for controlling the upper switch and a duty cycle of a second control signal for controlling the lower switch are complementary.

17. The power conversion system according to claim 16, wherein the duty cycle of the first control signal and the duty cycle of the second control signal are fixed.

18. The power conversion system according to claim 16, wherein the duty cycle of the first control signal and the duty cycle of the second control signal are gradually increased from zero to 50%, or the duty cycle of the first control signal is gradually increased from zero to 100%.

19. The power conversion system according to claim 15, wherein the upper switch is a controllable switch, and the lower switch is a diode, wherein the first terminal of the serially-connected structure is electrically connected with a node between a first terminal of the controllable switch and a cathode of the diode, an anode of the diode is electrically connected with a first negative electrode of the first terminal of the power conversion circuit, and a second terminal of the controllable switch is electrically connected with a first positive electrode of the first terminal of the power conversion circuit, wherein by controlling an on/off state of the controllable switch, the alternating voltage is generated.

20. The power conversion system according to claim 15, wherein the lower switch is a controllable switch, and the upper switch is a diode, wherein the first terminal of the serially-connected structure is electrically connected with a node between a first terminal of the controllable switch and an anode of the diode, a cathode of the diode is electrically connected with a first positive electrode of the first terminal of the power conversion circuit, and a second terminal of the controllable switch is electrically connected with a first negative electrode of the first terminal of the power conversion circuit, wherein by controlling an on/off state of the controllable switch, the alternating voltage is generated.

* * * * *